United States Patent
Berger et al.

(10) Patent No.: US 8,380,553 B2
(45) Date of Patent: Feb. 19, 2013

(54) ARCHITECTURAL DESIGN FOR PLAN-DRIVEN PROCUREMENT APPLICATION SOFTWARE

(75) Inventors: Arthur Berger, Heppenheim (DE); Bettina Jaeger, Heidelberg (DE); Peter Fitz, Waldsee (DE); Karin Brecht-Tillinger, Edingen-Neckarhausen (DE); Arnulf Schueler, Heidelberg (DE); Paola Sala, Heidelberg (DE); Armin Schwarz, Gaiberg (DE); Otfried Von Geisau, Sinsheim (DE); Peter J. Neumayer, Edenkoben (DE); Matthias Tebbe, Walldorf (DE); Jens Freund, Heidelberg (DE); Stefan Kaetker, Dossenheim (DE); Gerd Moosmann, Pforzheim (DE); Peter Latocha, Malsch (DE)

(73) Assignee: SAP AG, Walldorf (DE)

( * ) Notice: Subject to any disclaimer, the term of this patent is extended or adjusted under 35 U.S.C. 154(b) by 1443 days.

(21) Appl. No.: 11/322,382

(22) Filed: Dec. 30, 2005

(65) Prior Publication Data

US 2007/0156475 A1    Jul. 5, 2007

(51) Int. Cl.
*G06Q 10/00* (2012.01)
(52) U.S. Cl. .................................. 705/7.13
(58) Field of Classification Search ............. 705/7, 7.12
See application file for complete search history.

(56) References Cited

U.S. PATENT DOCUMENTS

| | | | |
|---|---|---|---|
| 4,947,321 A | 8/1990 | Spence et al. | |
| 5,361,198 A | 11/1994 | Harmon et al. | |
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |

(Continued)

FOREIGN PATENT DOCUMENTS

| WO | 00/23874 | 4/2000 |
|---|---|---|
| WO | WO 2004/083984 | 9/2004 |

(Continued)

OTHER PUBLICATIONS

Supply Chain Operations Reference Model version 5.0: A new tool to improve . . . S Stephens—Information Systems Frontiers, 2001—Springer.*

(Continued)

*Primary Examiner* — Jonathan G Sterrett
(74) *Attorney, Agent, or Firm* — Fish & Richardson P.C.

(57) ABSTRACT

Methods, systems, and apparatus, including computer program products, for implementing a software architecture design for a software application implementing plan-driven procurement. The application is structured as multiple process components interacting with each other through service interfaces, and multiple service interface operations, each being implemented for a respective process component. The process components include an Inbound Delivery Processing process component, a Material Inspection Processing process component, a Site Logistics Processing process component, a Confirmation and Inventory process component, a Purchase Request Processing process component, a Purchase Order Processing process component, a Purchasing Contract process component, a Supplier Invoice Processing process component, a Demand Forecast Processing process component, a Supply and Demand Matching process component, an External Procurement Trigger and Response process component, and a Logistics Execution Control process component.

20 Claims, 24 Drawing Sheets

U.S. PATENT DOCUMENTS

| | | |
|---|---|---|
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |
| 5,918,219 A | 6/1999 | Isherwood |
| 5,987,247 A | 11/1999 | Lau |
| 5,991,536 A | 11/1999 | Brodsky et al. |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,112,024 A | 8/2000 | Almond et al. |
| 6,151,582 A * | 11/2000 | Huang et al. ............ 705/8 |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 | 5/2001 | Sadahiro |
| 6,256,773 B1 | 7/2001 | Bowman-Amuah |
| 6,272,672 B1 | 8/2001 | Conway |
| 6,289,502 B1 | 9/2001 | Garland et al. |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Costanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 | 8/2004 | Ankireddipally et al. |
| 6,782,536 B2 | 8/2004 | Moore et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,950,802 B1 | 9/2005 | Barnes et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,051,071 B2 | 5/2006 | Stewart et al. |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,762 B2 | 7/2006 | Fisher |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,149,887 B2 | 12/2006 | Morrison et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,280,955 B2 | 10/2007 | Martin |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,401,334 B2 | 7/2008 | Fussell |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,493,594 B2 | 2/2009 | Shenfield et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,653,898 B1 | 1/2010 | Ali et al. |
| 7,657,406 B2 | 2/2010 | Tolone et al. |

| | | |
|---|---|---|
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,676,786 B2 | 3/2010 | Shenfield et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,784,025 B2 | 8/2010 | Challapalli et al. |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,805,365 B1 | 9/2010 | Slavin et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,006,224 B2 | 8/2011 | Bateman et al. |
| 8,010,938 B2 | 8/2011 | Elaasar |
| 8,051,332 B2 | 11/2011 | Zakonov et al. |
| 8,078,485 B1 | 12/2011 | Kraehmueller et al. |
| 8,086,995 B2 | 12/2011 | Luo et al. |
| 8,091,065 B2 | 1/2012 | Mir et al. |
| 8,112,738 B2 | 2/2012 | Pohl et al. |
| 8,140,455 B2 | 3/2012 | Hutson et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0069144 A1 | 6/2002 | Palardy |
| 2002/0073114 A1 | 6/2002 | Nicastro et al. |
| 2002/0073396 A1 | 6/2002 | Crupi et al. |
| 2002/0078046 A1 | 6/2002 | Uluakar et al. |
| 2002/0082892 A1 | 6/2002 | Raffel et al. |
| 2002/0095650 A1 | 7/2002 | Green et al. |
| 2002/0100014 A1 | 7/2002 | Iborra et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0165745 A1 | 11/2002 | Greene et al. |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1* | 4/2003 | Chen et al. .................. 707/100 |
| 2003/0083762 A1 | 5/2003 | Farrah et al. |
| 2003/0084127 A1 | 5/2003 | Budhiraja et al. |
| 2003/0101112 A1 | 5/2003 | Gallagher et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0117766 A1 | 6/2004 | Mehta et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0177342 A1 | 9/2004 | Worley, Jr. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0022160 A1 | 1/2005 | Uluakar et al. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |

| | | |
|---|---|---|
| 2007/0050308 A1 | 3/2007 | Latvala et al. |
| 2007/0074150 A1 | 3/2007 | Jolfaei et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0010049 A1 | 1/2008 | Pouchak et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

FOREIGN PATENT DOCUMENTS

WO    WO 2005/114381    12/2005

OTHER PUBLICATIONS

Supply chain configuration based on supply chain operations reference (SCOR) model SH Huang, SK Sheoran, H Keskar—Computers & Industrial Engineering, 2005—Elsevier.*

Linking SCOR planning practices to supply chain performance drkresearch.org [PDF] A Lockamy III, K McCormack - . . . of Operations and . . . , 2004—leeds2.emeraldinsight.com.*

Supply chain council & supply chain operations reference (scor) model S Stephens—www. supply-chain. org>. Acesso em—athabascau.ca.*

Supply chain metrics DM Lambert, TL Pohlen—International Journal of Logistics . . . , 2001—emeraldinsight.com.*

Keeping SCOR on Your Supply Chain: Basic Operations Reference Model . . . auerbach-publications.com [PDF] GJ Schultz—Information Strategy- . . . , 2003—auerbach-publications.com.*

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for Windows® Shipments in First Nine Months of Availability"; PR Newswire; Apr. 28, 1997.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

"Hudson's Bay Company Realizes Fast ROI with the Oracle E-Business Suite"; PR Newswire; New York; Jan. 15, 2002; p. 1.

International Preliminary Report on Patentability issued in International Application No. PCT/EP2007/002835; Sep. 30, 2008; 8 pages.

Office Action issued in U.S. Appl. No. 11/397,029; Jul. 21, 2009; 28 pages.

Office Action issued in U.S. Appl. No. 11/323,040; Jul. 24, 2009; 35 pages.

Office Action issued in U.S. Appl. No. 11/323,590; Jul. 10, 2009; 32 pages.

Office Action issued in U.S. Appl. No. 11/322,816; Jul. 23, 2006; 41 pages.

Office Action issued in U.S. Appl. No. 11/322,851; Sep. 2, 2009; 32 pages.

Office Action issued in U.S. Appl. No. 11/323,590; Dec. 30, 2009; 31 pages.

Office Action issued in U.S. Appl. No. 11/322,482; Jan. 7, 2010; 19 pages.

Office Action issued in U.S. Appl. No. 11/322,772; Dec. 9, 2009; 14 pages.

Office Action issued in U.S. Appl. No. 11/323,039; Sep. 4, 2009; 36 pages.

Office Action issued in U.S. Appl. No. 11/323,634; Sep. 10, 2009; 15 pages.

Office Action issued in U.S. Appl. No. 11/322,383; Nov. 12, 2009; 29 pages.

Office Action issued in U.S. Appl. No. 11/396,258; Nov. 25, 2009; 9 pages.

Office Action issued in U.S. Appl. No. 12/333,085; Jun. 25, 2009; 9 pages.

Office Action issued in U.S. Appl. No. 11/396,288; Aug. 19, 2009; 20 pages.

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fenner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docsVCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

"American Software Announces ASP Pricing Model for It's a-Applications Expense Business Solution"; PR Newswire; Mar. 6, 2000; 2 pages.

Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Intuit Canada Ltd.; "Startup Guide—QuickBooks Basic for Windows, QuickBooks Pro for Windows, QuickBooks Premier for Windows"; 2002; 230 pages.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
"Time Management with mySAP™ ERP Human Capital Management"; Downloaded Mar. 24, 2010. from <http://web.archive.org/web/20060105084834/www.sap.com/solutions/business-suite/erp/hem/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,398 on Apr. 2, 2010; 39 pages.
Office Action issued in U.S. Appl. No. 11/322,383; May 12, 2010; 23 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pp.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.
SSP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Office Action issued in U.S. Appl. No. 11/322,772; Jul. 12, 2010; 18 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Office Action issued in U.S. Appl. No. 11/322,845; Jul. 15, 2010; 16 pages.

Office Action issued in U.S. Appl. No. 11/323,040 on Nov. 5, 2010; 33 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 12/233,554 on Sep. 17, 2010; 10 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Oct. 20, 2010; 15 pages.
Notice of Allowance issued in U.S. Appl. No. 12/327,354 on Oct. 18, 2010; 16 pages.
Notice of Allowance issued in U.S. Appl. No. 11/967,865 on Oct. 6, 2010; 6 pages.
Notice of Allowance issued in U.S. Appl. No. 11/322,482; Jul. 13, 2010; 5 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMW FAQ_50070686_en.pdf.
Notice of Allowance issued in U.S. Appl. No. 11/322,610 on Dec. 22, 2010; 6 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,250 on Mar. 2, 2011; 13 pages.
Notice of Allowance issued in U.S. Appl. No. 11/322,845; Dec. 27, 2010; 16 pages.
Notice of Allowance issued in U.S. Appl. No. 11/397,026 on Mar. 3, 2011; 6 pages.
Notice of Allowance issued in U.S. Appl. No. 12/233,554 on Feb. 22, 2011; 7 pages.
Office Action issued in U.S. Appl. No. 12/233,550 on Jan. 12, 2011; 29 pages.
Office Action issued in U.S. Appl. No. 12/233,557 on Mar. 4, 2011; 19 pages.
Notice of Allowance issued in U.S. Appl. No. 12/233,534 on Jan. 31, 2011; 15 pages.
Notice of Allowance issued in U.S. Appl. No. 12/327,354 on Feb. 1, 2011; 16 pages.
Notice of Allowance issued in U.S. Appl. No. 11/396,327 on Nov. 30, 2010; 28 pages.
Notice of Allowance issued in U.S. Appl. No. 12/233,462 on Feb. 2, 2011; 11 pages.
Office Action issued in U.S. Application No. 11/967, 483 on Mar. 4, 2011; 6 pages.
Notice of Allowance issued in U.S. Appl. No. 11/322,610 on Mar. 31, 2011; 6 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Finin et al.; "KQML1 as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Office Action issued in U.S. Appl. No. 11/322,383 on May 12, 2010; 23 pages.
Office Action issued in U.S. Appl. No. 11/322,383 on Nov. 12, 2009; 23 pages.
Notice of Allowance issued in U.S. Appl. No. 12/233,534 on May 16, 2011; 12 pages.
Notice of Allowanced issued in U.S. Appl. No. 11/322,398 on May 27, 2011; 21 pages.
Notice of Allowance issued in U.S. Appl. No. 11/396,259 on Aug. 5, 2011; 7 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Notice of Allowance issued in U.S. Appl. No. 11/322,845; Apr. 8, 2011; 8 pages.
Office Action issued in U.S. Appl. No. 11/323,040 on Jul. 26, 2011; 34 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.

Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 11/967,489 on Sep. 28, 2011; 7 pages.
Office Action issued in U.S. Appl. No. 12/233,489 on May 13, 2011; 15 pages.
Office Action issued in U.S. Appl. No. 11/967,393 o n. Apr. 15, 2011; 12 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Business Editors/Technology Writers; "CrossWorlds Software Announces J2EE Interoperability with Open Standards Interface"; Business Wire, 1; Nov. 20; Retrieved on Jun. 12, 2012.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kagermann, Prof. Dr. Henning & Dr. Peter Zencke; "Plug-and-Play Vision Nears Reality with BPM"; Business Times; Sep. 8, 2005; p. 9.
Kloppmann et al.; "Business Process Choreography in WebSphere: Combining the Power of BPEL and J2EE"; IBM Systems Journal; 2004.
Kremic, Tibor; "Outsourcing Decision Support: A Survey of Benefits, Risks, and Decision Factor"; Supply Chain Management; V. 11; 2006; pp. 467-482.
Mani et al.; "Towards Information Networks to Support Composable Manufacturing"; PerMIS 2008.
Meseroll, Robert; "Data Mining Navy Flight"; IEEE Autotestcom 2007; Sep. 2007; pp. 476-481.
Molina et al.; "Resuable Knowledge Based Components for Building Software Applications: A Knowledged Modeling Approach"; International Journal of Software Engineering and Knowledge Engineering; vol. 9, No. 3; 1999; pp. 297-317.
Sarjoughian et al.; "CoSMOs: A Visual Environment for Component Based Modeling, Experimental Design and Simulation"; ACM; 2009; pp. 1-9.
"SAP NetWeaver Empowers IT to Drive Innovation into Business Processes across the Enterprise"; Canada NewsWire, 1; May 13; Retrieved on Jun. 12, 2012.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Zeng et al.; "Model Analysis for Business Event Processing"; IBM Systems Journal 2007.
Zimmermann et al.; "Service-Oriented Architecture and Business Process Choreography in an Order Management Scenario: Rationale, Concepts, Lessons Learned"; OOPLA 2005.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Office Action issued in U.S. Appl. No. 11/322,816 on Jun. 7, 2012; 12 pages.
Notice of Allowaqnce issued in U.S. Appl. No. 11/322,383 on May 21, 2012; 14 pages.
Notice of Allowance issued in U.S. Appl. No. 11/396,327 on Sep. 28, 2011; 31 pages.
Notice of Allowance issued in U.S. Appl. No. 11/396,327 on Jun. 20, 2012; 29 pages.
Notice of Allowance issued in U.S. Appl. No. 11/404,147 on Jul. 5, 2012; 17 pages.
Office Action issued in U.S. Appl. No. 12/233,479 on Oct. 27, 2011; 24 pages.
Office Action issued in U.S. Appl. No. 12/233,479 on May 7, 2012; 26 pages.
Office Action issued in U.S. Appl. No. 12/332,965 on Oct. 11, 2011; 6 pages.
Notice of Allowance issued in U.S. Appl. No. 12/332,965 on Jun. 11, 2012; 21 pages.
Notice of Allowance in U.S. Appl. No. 12/233,462 on Dec. 12, 2011; 6 pages.
Notice of Allowance in U.S. Appl. No. 12/233,462 on Apr. 5, 2012; 7 pages.
Office Action issued in U.S. Appl. No. 12/233,289 on Oct. 27, 2011; 15 pages.
Notice of Allowance issued in U.S. Appl. No. 12/233,289 on Feb. 15, 2012; 11 pages.
Notice of Allowance issued in U.S. Appl. No. 12/233,457 on Nov. 3, 2011; 12 pages.
Notice of Allowance issued in U.S. Appl. No. 12/233,457 on May 16, 2012; 7 pages.
Notice of Allowance issued in U.S. Appl. No. 12/327,232 on Nov. 2, 2011; 16 pages.
Notice of Allowance issued in U.S. Appl. No. 12/327,232 on Jun. 6, 2012; 7 pages.
Notice of Allowance issued in U.S. Appl. No. 12/327,590 on Dec. 28, 2011; 10 pages.
Notice of Allowance issued in U.S. Appl. No. 12/327,590 on Jul. 19, 2012; 11 pages.
Office Action issued in U.S. Appl. No. 12/327,701 on Nov. 8, 2011; 20 pages.
Notice of Allowance issued in U.S. Appl. No. 12/327,701 on Apr. 6, 2012; 9 pages.
Supplemental Notice of Allowance issued in U.S. Appl. No. 12/333,085; Jun. 13, 2012; 5 pages.
Notice of Allowance issued in U.S. Appl. No. 12/233,087 on Mar. 30, 2012; 30 pages.
Notice of Allowance issued in U.S. Appl. No. 12/233,534 on Dec. 28, 2011; 7 pages.
Notice of Allowance issued in U.S. Appl. No. 12/233,534 on Jul. 18, 2012; 16 pages.
Notice of Allowanced issued in U.S. Appl. No. 11/322,398 on Oct. 18, 2011; 7 pages.
Notice of Allowanced issued in U.S. Appl. No. 11/322,398 on May 3, 2012; 7 pages.
Office Action issued in U.S. Appl. No. 11/323,041 on Jun. 7, 2012; 12 pages.
Examiner's Answer to Appeal Brief issued in U.S. Appl. No. 11/396,236 on Nov. 10, 2011; 19 pages.

Notice of Allowance issued in U.S. Appl. No. 11/323,039 on Jun. 7, 2012; 9 pages.
Office Action issued in U.S. Appl. No. 11/322,612 on Jun. 26, 2012; 11 pages.
Notice of Allowance issued in U.S. Appl. No. 11/396,259 on Mar. 15, 2012; 7 pages.
Office Action issued in U.S. Appl. No. 11/396,288 on Oct. 17, 2011; 38 pages.
Notice of Allowance issued in U.S. Appl. No. 11/396,288; Apr. 27, 2012; 15 pages.
Notice of Allowance issued in U.S. Appl. No. 11/396,250 on Dec. 7, 2011; 6 pages.
Notice of Allowance issued in U.S. Appl. No. 11/396,250 on Jul. 10, 2012; 6 pages.
Notice of Allowance issued in U.S. Appl. No. 11/396,258 on Feb. 3, 2012; 12 pages.
Office Action issued in U.S. Appl. No. 11/396,252 on Nov. 10, 2011; 18 pages.
Notice of Allowance issued in U.S. Appl. No. 11/322,851 on Mar. 1, 2012; 9 pages.
Notice of Allowance issued in U.S. Appl. No. 11/322,845; Nov. 13, 2011; 9 pages.
Notice of Allowance issued in U.S. Appl. No. 11/323,040 on Jun. 8, 2012; 9 pages.
Notice of Allowance issued in U.S. Appl. No. 11/397,026 on Nov. 4, 2011; 8 pages.
Notice of Allowance issued in U.S. Appl. No. 11/397,026 on Feb. 23, 2012; 8 pages.
Notice of Allowance issued in U.S. Appl. No. 12/233,520 on Nov. 10, 2011; 22 pages.
Office Action issued in U.S. Appl. No. 13/413,069 on Aug. 1, 2012; 18 pages.
Notice of Allowance issued in U.S. Appl. No. 12/233,417 on Jul. 27, 2012; 10 pages.
Office Action issued in U.S. Appl. No. 12/233,458 on Oct. 12, 2011; 19 pages.
Notice of Allowance issued in U.S. Appl. No. 12/233,458 on May 1, 2012; 17 pages.
Office Action issued in U.S. Appl. No. 11/967,489 on Feb. 6, 2012; 9 pages.
Office Action issued in U.S. Appl. No. 12/233,489 on Jun. 6, 2012; 87 pages.
Notice of Allowance issued in U.S. Appl. No. 11/967,393 on Nov. 9, 2011; 9 pages.
Notice of Allowance issued in U.S. Appl. No. 12/327,354 on Jul. 25, 2012; 17 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/327,737 on Jul. 10, 2012; 7 pages.
Notice of Allowance issued in U.S. Appl. No. 12/233,075 on Mar. 22, 2012; 25 pages.

\* cited by examiner

ARCHITECTURAL DESIGN FOR PLAN-DRIVEN PROCUREMENT APPLICATION SOFTWARE

BACKGROUND

The subject matter of this patent application relates to computer software architecture, and more particularly to the architecture of application software for plan-driven procurement.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing plan-driven procurement.

The invention can be implemented as methods, systems, and apparatus, including computer program products, for implementing a software architecture design for a software application implementing plan-driven procurement. The application is structured as multiple process components interacting with each other through service interfaces, and multiple service interface operations, each being implemented for a respective process component. The process components include an Inbound Delivery Processing process component, a Material Inspection Processing process component, a Site Logistics Processing process component, a Confirmation and Inventory process component, a Purchase Request Processing process component, a Purchase Order Processing process component, a Purchasing Contract process component, a Supplier Invoice Processing process component, a Demand Forecast Processing process component, a Supply and Demand Matching process component, an External Procurement Trigger and Response process component, and a Logistics Execution Control process component.

The invention can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
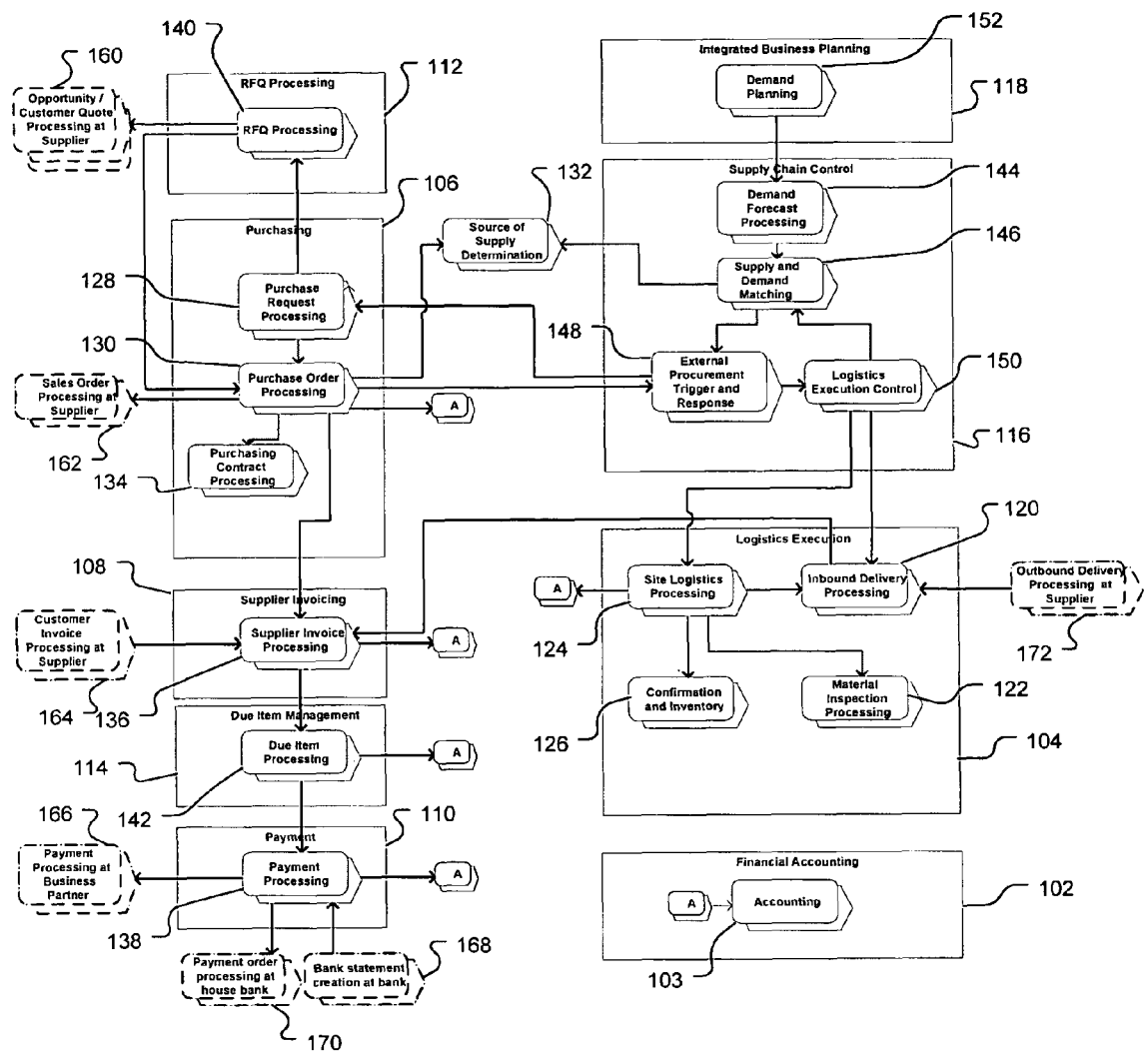
FIG. 1 is a block diagram of a software architectural design for a plan-driven procurement software application.

FIG. 1 shows the software architectural design for a plan-driven procurement software application. The plan driven procurement application is software that implements an end-to-end process used to procure goods using purchase orders that may be driven by a planning department to increase the stock of goods.

As shown in FIG. 1, the plan-driven procurement design includes nine deployment units: a Financial Accounting deployment unit 102, a Logistics Execution deployment unit 104, a Purchasing deployment unit 106, a Supplier Invoicing deployment unit 108, a Payment deployment unit 110, a Request for Quote deployment unit 112, a Due Item Management deployment unit 114, a Supply Chain Control deployment unit 116, an Integrated Business Planning deployment unit 118, and a The Financial Accounting deployment unit 102 includes an Accounting process component 103 that records all relevant business transactions.

The Logistics Execution deployment unit 104 includes four process components: an Inbound Delivery Processing process component 120, a Material Inspection Processing process component 122, a Site Logistics Processing process component 124 and a Confirmation and Inventory process component 126.

The Inbound Delivery Processing process component 120 combines tasks concerning inbound delivery processes and enables communication with a vendor and a process component within the Supplier Invoice deployment unit 108. For example, the Inbound Delivery Processing process component 120 may prepare and trigger execution of physical operations associated with an invoice.

The Material Inspection Processing process component 122 provides services related to quality inspection that may be performed to check that a material fulfills its specified requirements. The process steps to perform the quality inspection include creating the inspection and documenting the inspection results and inspection decision.

The Site Logistics Processing process component 124 supports all preparation and execution tasks concerning internal inventory movement in a warehouse type environment. The Site Logistics Processing process component 124 may provide stock information such as special stock items. Exception and alert information may also be provided by the Site Logistics Processing process component 124.

The Confirmation and Inventory process component 126 combines all tasks required to confirm inventory changes and provided activities. The Confirmation and Inventory process component 126 may provide services to maintain current stock, handling unit content, logistics operating unit content and allocation content.

The Purchasing deployment unit 106 includes three process components: a Purchase Request Processing process component 128, a Purchase Order Processing process component 130, and a Purchasing Contract Processing process component 134.

The Purchase Request Processing process component 128 provides a request or instruction to the purchasing department to purchase specified goods or services in specified quantities within a specified time.

The Purchase Order Processing process component 130 includes a Purchase Order business object and a Purchase Order confirmation business object. The purchase order is a request from a purchaser to an external supplier to deliver a specified quantity of goods, or perform a specified service within a specified time. The purchase order confirmation is a communication from a supplier to a purchaser to advise that a purchase order has been received. In particular, a purchase order confirmation may advise the purchaser of the supplier accepting the purchase order, or the supplier proposing changes to the purchase order, or the supplier not accepting the purchase order.

A Source of Supply Determination process component 132 uses two business objects to determine a source of supply: a Supply Quota Arrangement business object, and a Source of Supply business object. A supply quota arrangement is a distribution of material requirements or goods to different sources of supply, business partners, or organizational units within a company. An example of the use of supply quota arrangements is the distribution of material requirements between in-house production and different sources for external procurement. A supply quota arrangement can also define the distribution of goods to customers in case of excess production or shortages. A source of supply is an object that describes a logical link between a possible source of products and a possible target.

The Purchasing Contract process component 134 handles an agreement between a purchaser and a supplier that details the supply of goods or the performance of services at agreed conditions. The Purchasing Contract process component 134 includes the Purchasing Contract business object.

The Supplier Invoicing deployment unit 108 includes a Supplier Invoice Processing process component 136. The Supplier Invoice Processing process component 136 includes a Supplier Invoice business object and a Supplier invoice Request business object. The supplier invoice is a document that states the recipient's obligation to pay the supplier for goods received or services rendered. The invoice may be created after the goods and service acknowledgment has been confirmed. The supplier invoice request is a document that is sent to invoice verification, advising that an invoice for specified quantities and prices is expected and may be created through evaluation settlement. The system uses the invoice request as a basis for invoice verification, as well as for the automatic creation of the invoice.

The Payment deployment unit 110 includes a Payment Processing process component 138. The Payment Processing process component 138 is used to handle all incoming and outgoing payments as well as represent the main database for a liquidity status.

The RFQ Processing deployment unit 112 includes an RFQ Processing process component 140. The RFQ Processing process component 140 handles requests for quotation and corresponding quotes. A request for quotation (RFQ) is a description of materials and services that purchasers use to request responses from potential suppliers. Requests for Quotation can be one of a number of types, including: a request for price information, a request for quote that may run over a certain period of time, a request for proposal in complex purchasing situation or live auctions that may be performed over a short time frame. A quote is a response to a request for quotation in which a supplier offers to sell goods and services at a certain price. The quote can be subject to complex pricing and conditions.

The Due Item Management deployment unit 114 includes a Due Item Processing process component 142. The Due Item Processing process component 142 is used to manage all payables, receivables from service and supply and corresponding sales including a withholding tax.

The Supply Chain Control deployment unit 116 includes a Demand Forecast Processing process component 144, a Supply and Demand Matching process component 146, an External Procurement Trigger and Response process component 148, and a Logistics Execution Control process component 150. The Demand Forecast Processing process component 144 collects all demand forecasts for further processing. For example, a validation may be carried out, or the requirements may be split over time. According to the results created by the demand forecast component, the requirements are passed on to the supply and demand matching component as planned independent requirements.

The Supply and Demand Matching process component 146 combines all the tasks necessary to ensure that sufficient material receipt elements exist to cover material demand while taking available capacity into account. For example, the Supply and Demand Matching process component 146 may collect all the various material demands from customer requirement processing, the in-house requirement processing, the demand forecast processing, and the sales scheduling agreement processing and attempt to assign all the existing material receipts. The Supply and Demand Matching process component 146 may also plan the internal or external procurement of further material receipts where necessary.

The External Procurement Trigger and Response process component 148 combines all the tasks necessary for processing planned external procurement orders and provides an interface to purchasing from a supply planning perspective. The External Procurement Trigger and Response process component 148 may collect all due planned external procurement orders in the form of purchase requisitions and may hand the orders over to purchasing. The External Procurement Trigger and Response process component 148 may receive purchase orders from purchasing and may return the information concerning the purchase order fulfillment.

The Logistics Execution Control process component 150 controls and monitors the supply chain execution activities necessary for the fulfillment of an order. For example, sales order activities or purchase order activities may be controlled and monitored by the logistics execution control process component. The Logistics Execution Control process component 150 sends information to the logistics execution to trigger the necessary supply chain execution activities, receives information about the supply chain execution progress, and updates data relevant for both fulfillment and supply and demand planning.

The Integrated Business Planning deployment unit 118 includes a Demand Planning process component 152. The Demand Planning process component 152 combines all the tasks required to anticipate future demand. This information may then be used for supply and capacity planning.

The foundation layer, described below, includes a Source of Supply Determination process component 132.

The Source of Supply Determination process component 132 uses two business objects to determine a source of supply: a supply quota arrangement business object, and a source of supply business object. A supply quota arrangement is a distribution of material requirements or goods to different sources of supply, business partners, or organizational units within a company. An example of the use of supply quota arrangements is the distribution of material requirements between in-house production and different sources for external procurement. A supply quota arrangement can also define the distribution of goods to customers in case of excess production or shortages. A source of supply is an object that describes a logical link between a possible source of products and a possible target.

A number of external process components, described below, will be used to describe the architectural design. These include an Opportunity/Customer Quote Processing at Supplier 160, a Sales Order Processing at Supplier process component 162, a Customer Invoice Processing at Supplier 164, a Payment Processing at Business Partner process component 166, a Bank statement create at bank process component 168, a Payment order processing at house bank process component 170, and an Outbound Delivery Processing process component 172.

The Opportunity/Customer Quote Processing at Supplier process component 160 may receive messages from the RFQ Processing process component 140.

The plan-driven procurement design includes a Sales Order Processing at Supplier process component 162. The Sales Order Processing at Supplier process component 162 handles customers' requests to a company for delivery of goods or services at a certain time. The requests are received by a sales area, which is then responsible for fulfilling the contract.

The Payment Processing at Business Partner process component 166, the Bank statement create at bank process component 168, and the Payment order processing at house bank process component 170 may interact with the Payment Processing process component 138. The Payment Processing Process component 138 may send updates to a Payment Processing at Business Partner processing component 166, which is used to handle, at business partner, all incoming and outgoing payments and represent the main data base for the liquidity status. The Payment Processing Process component 138 also receives messages from the Bank statement creates at bank process component 168. The message may include a bank Statement for a bank account. The Payment Processing Process component 138 sends messages to the Payment order processing at house bank process component 170. The messages may include a Bank Payment Order that is a Payment Order which will be sent to a house bank. The bank payment order may contain bank transfers as well direct debits.

The Outbound Delivery Processing process component 172 constitutes logistics execution driven by an outbound delivery request for shipping goods to a product recipient. It combines all tasks concerning the outbound delivery process (preparation and triggering of execution), and enables communication with the product recipient and invoicing.

Figure 2:
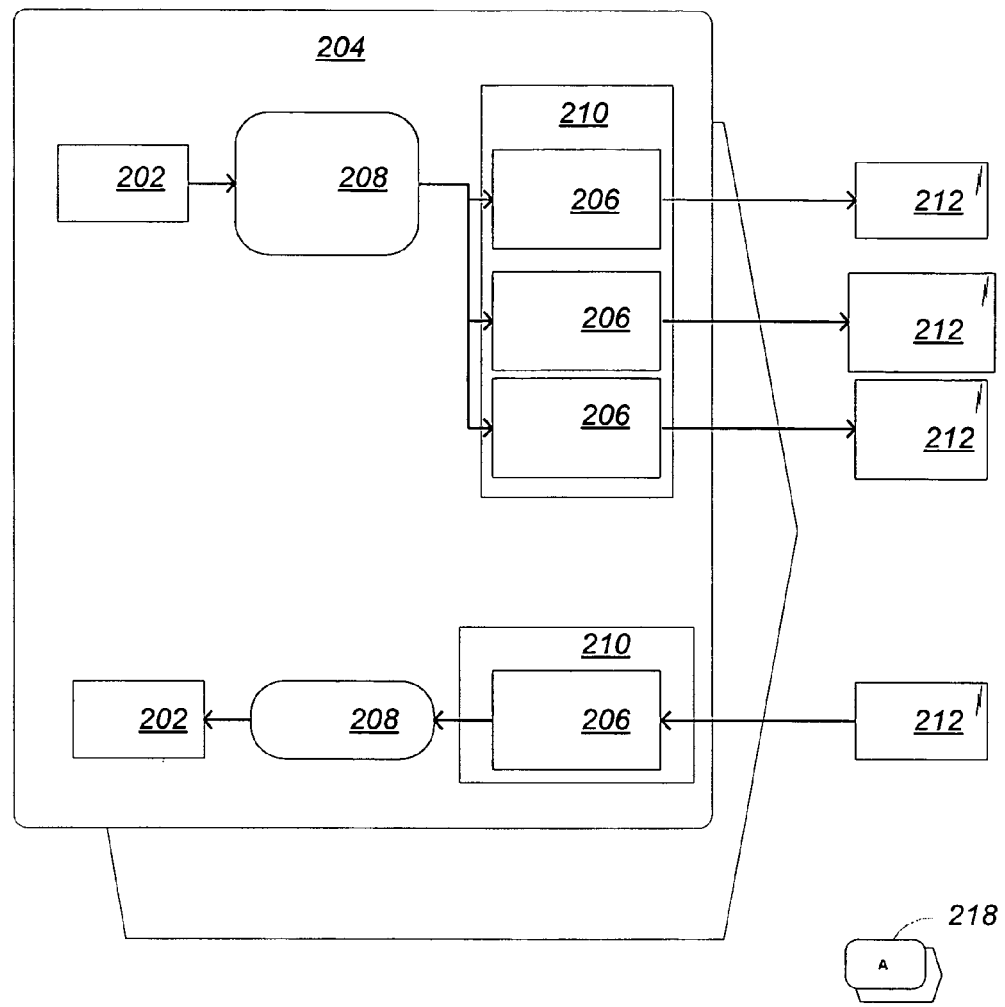
FIG. 2 illustrates the elements of the architecture as they are drawn in the figures of this patent application.

FIG. 2 illustrates the elements of the architecture as they are drawn in the figures of this patent application. The elements of the architecture include the business object (drawn as icon 202), the process component (drawn as icon 204), the operation (drawn as icon 206), the process agent (drawn as icon 208), the service interface or interface (drawn as icon 210), the message (drawn as icon 212), and the deployment unit (drawn as icon 214).

Not explicitly represented in the figures is a foundation layer that contains all fundamental entities that are used in multiple deployment units. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are assigned to their respective deployment unit.

A process component of an external system is drawn as a dashed-line process component (drawn as icon 216). Such a process component may be referred to as an external process component, and it is used to represent the external system in describing interactions with the external system; however, this should be understood to require no more of the external system that it be able to produce and receive messages as required by the process component that interacts with the external system.

The connector icon 218 is used to simplify the drawing of interactions between process components.

Interactions between process component pairs involving their respective business objects, process agents, operations, interfaces, and messages are described as process component interactions, which determine the interactions of a pair of process components across a deployment unit boundary, i.e., from one deployment unit to another deployment unit. Interactions between process components are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components, but interfaces, process agents, and business objects that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters serving as a signature.

The architectural elements also include the service interface, referred to simply as the interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement supports the operations of the original.

Interactions Between Process Components "Purchase Request Processing" and "RFQ Processing"

Figure 3:
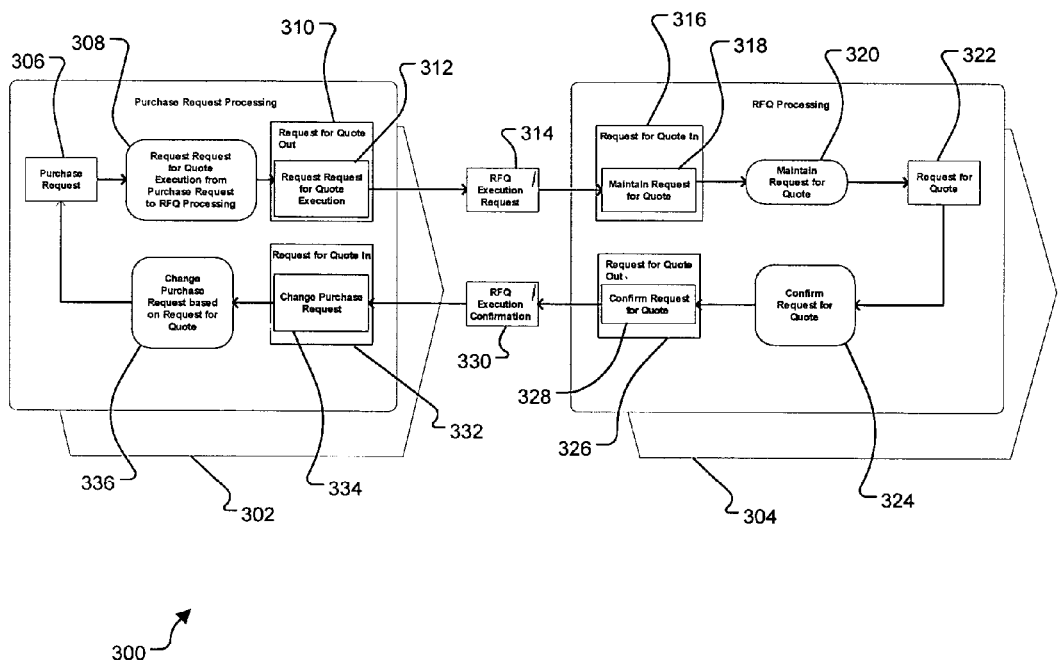
FIG. 3 is a block diagram showing interactions between a Purchase Request Processing process component and an RFQ Processing process component.

FIG. 3 is a block diagram showing interactions between a Purchase Request Processing process component 302 and an RFQ Processing process component 304 in the architectural design of FIG. 1.

The Purchase Request Processing process component 302 includes a Purchase Request business object 306. The Purchase Request business object 306 contains a request or instruction to the purchasing department to purchase goods or services in specified quantities within a particular period.

In the Purchase Request Processing process component 302, a Request Request for Quote Execution from Purchase Request to RFQ Processing outbound process agent 308 requests the execution of a request for quote. The outbound process agent 308 uses a Request Request for Quote Execution operation 312 to send an RFQ Execution Request message 314 to the RFQ Processing process component 304. The Request Request for Quote Execution operation 312 is part of a Request for Quote Out interface 310.

The RFQ Execution Request message 314 is received by a Maintain Request for Quote operation 318 in a Request for Quote In interface 316, where the operation initiates a Maintain Request for Quote inbound process agent 320, which creates or updates a Request For Quote business object 322 out of business documents, such as the Request for Quote business object document that are involved in the bidding process or in the negotiation process. Next, the Confirm Request for Quote outbound process agent 324 receives the request for quote and initiates a Confirm Request for Quote operation 328 in a Request for Quote Out Interface 326

The Confirm Request for Quote operation 328 sends a Request for Quote Execution Confirmation message 330 to the Purchase Request processing component 302 to confirm RFQ execution. The Change Purchase Request operation 334, which is included in a Request for Quote In interface 332, receives the message and initiates an inbound process agent Change Purchase Request based on Request for Quote 336. The inbound process agent 336 updates the references of the purchase request in the Purchase Request business object 306.

Interactions Between Process Components "Due Item Processing" and "Payment Processing"

Figure 4:
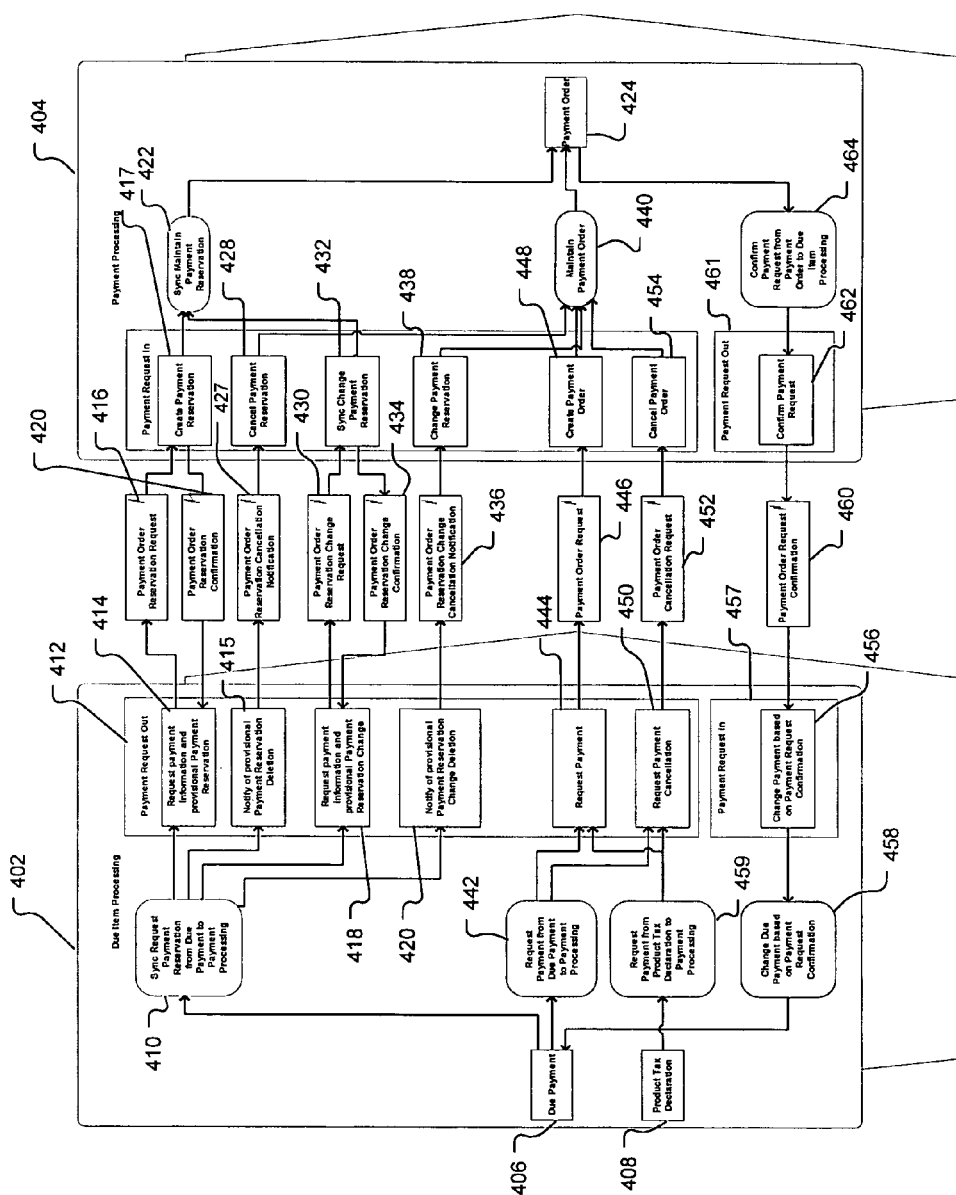
FIG. 4 is a block diagram showing interactions between a Due Item Processing process component and a Payment Processing process component.

FIG. 4 is a block diagram showing interactions between a Due Item Processing process component 402 and a Payment Processing process component 404 in the architectural design of FIG. 1. The Due Item Processing process component 402 may be used to manage all payables and receivables from service and supply and corresponding sales including a withholding tax. The Payment Processing process component 404 is used to handle all incoming and outgoing payments and represent the main database for a liquidity status.

The process components include business objects to create and update data by passing messages between the Payment Request process component 404 and the Due Item Processing process component 402. Multiple operations can be carried out within the interfaces. Both inbound and outbound process agents carry the business object data to and from the interfaces.

A due payment business object 406 may create payment requests manually or automatically for payment processing. The due payment business object 406 is responsible for the payment and clearing of payables and receivables for goods and services. A product tax declaration business object 408 is a declaration of the product tax liabilities/receivables of a company to the responsible tax authority according to the tax declaration arrangement and country specific legal requirements that triggers the payment to the tax authority.

A Synchronous Request Payment Reservation interface from Due Payment to Payment Processing outbound process component 410 may create a payment reservation request from Due Payment. The Payment Request Out interface 412 includes several operations which go on to create messages and updates to business objects in the Payment Processing process component 404. The operations, messaging and business objects are discussed in the following paragraphs.

The Payment Request Out interface 412 includes a synchronous Request payment information and provisional Payment Reservation operation 414 that generates a Payment Order Reservation Request message 416 to request a payment order reservation. A synchronous Create Payment Reservation operation 417 receives the message and uses a Sync Maintain Payment Reservation inbound process agent 422 to update a Payment Order business object 424. In addition, a Payment Order Reservation Confirmation synchronous message 420 is sent back to the Due Item Processing process component 402.

The Payment Request Out interface 412 also includes a Notify of provisional Payment Reservation Deletion operation 415 that registers the change of a provisional payment to the last transactional/saved state. A Payment Order Reservation Cancellation Notification message 427 may be generated and a Cancel Payment Reservation operation 428 may be invoked that cancels a previously sent payment reservation by reference. Next, a maintain Payment Order inbound process agent sends an update to the Payment Order business object 424.

The Payment Request Out interface 412 further includes a synchronous Request Payment Information and provisional Payment Reservation Change operation 418 that requests payment information with a provisional reservation of money in payment processing. A Payment Order Reservation Change Request synchronous message 430 is generated and a synchronous Sync Change Payment Reservation operation 432 is invoked that changes a reservation of payment and confirms the change to the caller. Next, a Payment Reservation Confirmation synchronous message 434 may be generated and sent back to the Due Item Processing process component 402.

The Payment Request Out interface 412 further includes a Notify of provisional Payment Reservation Change Deletion operation 420 that registers the change of a provisional payment to the last transactional/saved state. A Payment Order Reservation Change Deletion Cancellation Notification message 436 may be generated and a Change Payment Reservation operation 438 may be invoked that changes a previously sent payment reservation by reference. Upon completion of the operation 438, the Maintain Payment Order inbound process agent 440 updates the Payment Order business object 424.

A Request Payment from Due Payment to Payment Processing outbound process agent 442 may send a payment update to the Payment Processing process component 404 from a Due Payment business object 406. A Request Payment operation 444 is then invoked that sends a request for payment to Payment Processing. Upon completion of the operation, a Payment Order Request message 446 is sent the Payment Processing process component 404, where a Create Payment Order operation 448 begins. Then, the Maintain Payment Order inbound process agent 440 updates the Payment Order business object 424 to create or cancel a payment order.

A Request Payment from Product Tax Declaration to Payment Processing outbound process agent 459 may send an update from a Product Tax Declaration business object 408. The update is sent into the Payment Request Out interface 412 and a Request Payment Cancellation operation 450 is invoked to cancel a provisional, requested or ordered payment. A Payment Order Cancellation Request message 452 is then generated and sent to the Payment Processing process component where a Cancel Payment Order operation 454 is invoked.

The payment order business object may use a Confirm Payment Request from Payment Order to Due Item Processing outbound process agent 464 to confirm the processing status of a payment to the sender of a payment request. A Confirm Payment Request operation 462 may then be invoked, thereby generating a Payment Order Request Confirmation message 460 to send to the Due Item Processing process component 402. The message is received in a Change payment based on Payment Request Confirmation operation 456 that uses a Change Due Payment based on Payment Request Confirmation outbound process agent 458 to update the processing status of Due Payment based on the confirmation of a payment request.

Process Component Interaction Model "Purchase Order Processing" and "Accounting"

Figure 5:
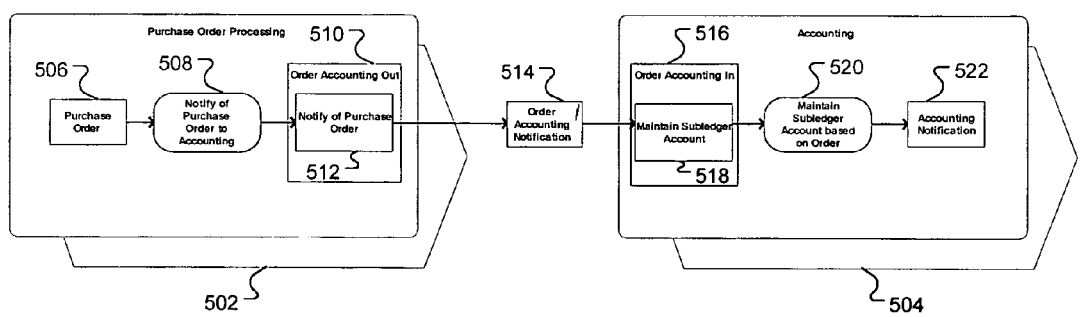
FIG. 5 is a block diagram showing interactions between a Purchase Order Processing process component and an Accounting process component.

FIG. 5 is a block diagram showing interactions between a Purchase Order Processing process component 502 and an Accounting process component 504 in the architectural design of FIG. 1. The Purchase Order Processing process component 502 includes the Purchase Order business object 506, which passes information into a Notify of Purchase Order to Accounting outbound process agent 508. The information may contain notifications about created, changed or cancelled purchase orders.

The outbound process agent 508 sends notification into an Order Accounting Out interface 510 which includes a Notify of Purchase Order operation 512. The Notify of Purchase Order operation 512 may occur when a purchase order has been created, changed or cancelled. An Order Accounting Notification message 514 may then be sent to the Accounting process component 504.

The Accounting process component 504 receives the Order Accounting Notification message 514 in the interface 516 which includes a Maintain Subledger Account operation 518 that receives order accounting notifications from the Purchase Order Processing process component 502. The notification is to inform Accounting Processing about the creation, the change or the deletion of any kind of order business objects. The notification may then be sent to the Accounting Notification business object 522 using an inbound process agent 520. The Accounting Notification business object 522 is a common input channel for all kinds of operational business transactions into Financial Accounting that is called by operational components in order to record the business transactions in financial accounting.

Interactions Between Process Components "Logistics Execution Control" and "Inbound Delivery Processing"

Figure 6:
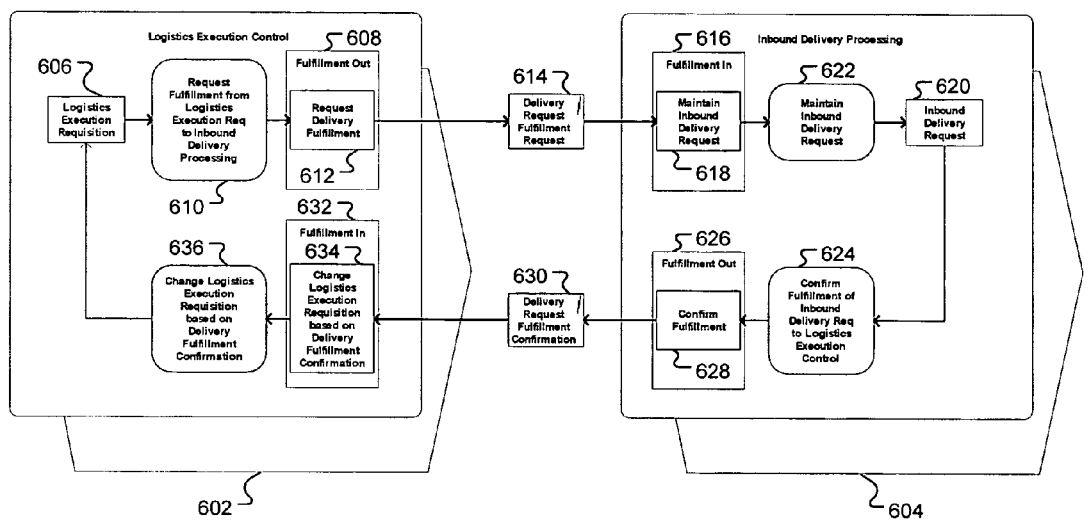
FIG. 6 is a block diagram showing interactions between a Logistics Execution Control process component and an Inbound Delivery Processing process component.

FIG. 6 is a block diagram showing interactions between a Logistics Execution Control process component 602 and an Inbound Delivery Processing process component 604 in the architectural design of FIG. 1. The Logistics Execution Control process component 602 controls and monitors, on a macro logistics level, the supply chain execution activities necessary for the fulfillment of an order. It sends information to logistics execution to trigger the necessary supply chain execution activities, receives information about the supply chain execution progress, and updates data relevant for both fulfillment and supply and demand planning.

The Inbound Delivery Processing process component 604 includes logistics execution driven by an inbound delivery request for receiving goods from a vendor. It combines all tasks concerning the inbound delivery process (preparation and triggering of execution), and enables communication with the vendor and invoicing.

The Logistics Execution Control process component 602 includes a Logistics Execution Requisition business object 606 that sends data into a Fulfillment Out interface 608 using a Request Fulfillment from Logistics Execution Request to Inbound Delivery Processing outbound process agent 610. The Fulfillment Out interface 608 includes a Request Delivery Fulfillment operation 612 in order to maintain a delivery request. The Logistics Execution Requisition business object 606 may send instructions to logistics execution, which supports the controlling, triggering and monitoring of supply chain execution activities necessary for the fulfillment of an order.

A Delivery Request Fulfillment Request message 614 is then sent to a Fulfillment In interface 616 located in the Inbound Delivery Processing process component 604. The interface contains a Maintain Inbound Delivery Request operation 618, which receives delivery fulfillment requests from logistics execution control and sends the requests into an Inbound Delivery Request business object 620 using a Maintain Inbound Delivery Request inbound process agent 622. The Inbound Delivery Request business object 620 is a document in the inbound delivery process containing all the relevant logistics data from the initiator of the inbound delivery process (such as the purchase order, for example). The inbound delivery request is used to validate an inbound delivery and an advanced shipping notification, and to prepare inbound logistics for receiving the goods. Upon receipt of the inbound delivery request, a Confirm Fulfillment of Inbound Delivery Request to Logistics Execution Control outbound process agent 624 sends the confirmation data into a Fulfillment Out interface 626 where a Confirm Fulfillment operation 628 may take place. Upon completion of the Confirm Fulfillment operation 628, a Delivery Request Fulfillment Confirmation message 630 is created and sent back to the Logistics Execution Control process component 602 to receive fulfillment confirmation data. Receiving the Delivery Fulfillment Confirmation message 630 in the Logistics Execution Control process component 602 may invoke a Change Logistics Execution Requisition based on the Delivery Fulfillment Confirmation operation 634. The operation 634, which is included in a Fulfillment In interface 632, may then send updates or changes by way of a Change Logistics Execution Requisition based on Delivery Fulfillment inbound process agent 636 into the Logistics Execution Requisition business object 606.

Interactions Between Process Components "Payment Processing" and "Payment Processing at Business Partner"

Figure 7:
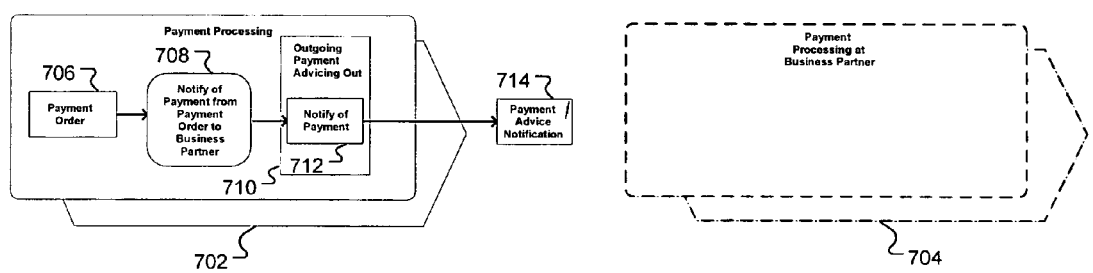
FIG. 7 is a block diagram showing interactions between a Payment Processing process component and a Payment Processing at a Business Partner processing component.

FIG. 7 is a block diagram showing interactions between Payment Processing process component 702 and a Payment Processing at a Business Partner processing component 704 in the architectural design of FIG. 1. The Payment Processing process component 702 is used to handle all incoming and outgoing payments and to represent the main database for a liquidity status. Business partners may be any third party operating an independent system.

The interaction model begins in the Payment Processing process component 702 with a Payment Order business object 706. The Payment Order business object 706 creates payment media for either a bank, a credit card a settlement institute, or a business partner on the base of payment requests. After the payment is created, the Payment Order business object 706 sends a notification using a Notify of Payment from Payment Order to Business Partner outbound process agent 708. A Payment Order can create different (sub) items within a payment that is sent if the payment medium is subject to amount limitations. The Payment Processing process component 702 also contains an Outgoing Payment Advicing Out interface 710 that includes a Notify of Payment operation 712. The Notify of Payment operation 712 creates a payment advice and sends a Payment Advice Notification message 714 to the Payment Processing at Business Partner processing component 704.

Interactions Between Process Components "Purchase Order Processing" and "Supplier Invoice Processing"

Figure 8:
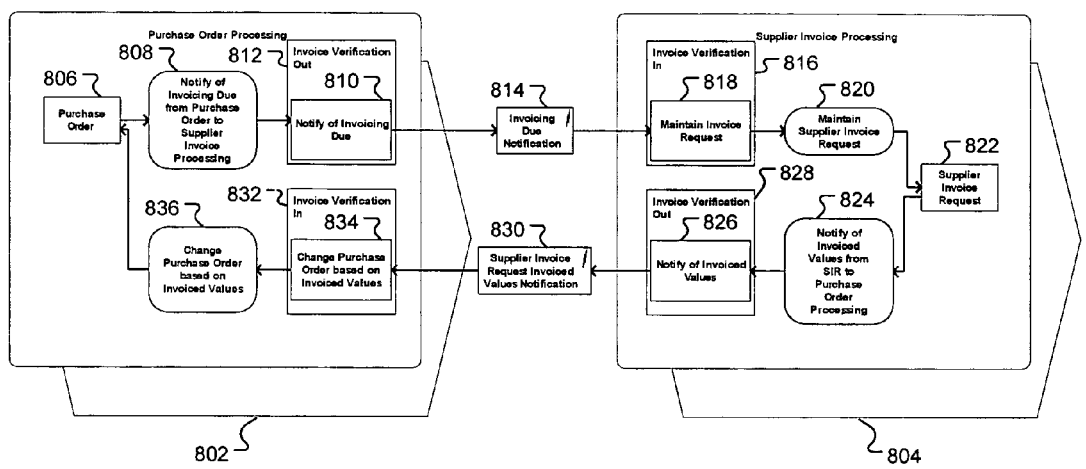
FIG. 8 is a block diagram showing interactions between a Purchase Order Processing process component and a Supplier Invoice Processing process component.

FIG. 8 is a block diagram showing interactions between a Purchase Order Processing process component 802 and a Supplier Invoice Processing process component 804 in the architectural design of FIG. 1.

The Purchase Order Processing process component 802 includes a Purchase Order business object 806 which includes a request from a purchaser. The Purchase Order business object 806 may uses a Notify of Invoicing Due from Purchase Order to Supplier Invoice Processing outbound process agent 808 to communicate with business objects in the Supplier Invoice Processing process component 804. The Notify of Invoicing Due from Purchase Order to Supplier Invoice Processing outbound process agent 808 may invoke a Notify of Invoicing Due operation 810 of an Invoice Verification Out interface 812 to send an Invoicing Due Notification message 814 that will be received by components in the Supplier Invoice Processing process component 804. The message 814 is routed to an Invoice Verification In interface 816 where a Maintain Invoice Request operation 818 is invoked to create or update a reference object in the Supplier Invoicing deployment unit 108 in order to perform invoice verification with reference to a purchase order without having to access other deployment units. A Maintain Supplier Invoice Request inbound process agent 820 sends updates or changes to the invoice data into the Supplier Invoice Request business object 822. The system uses the Supplier Invoice Request business document as a basis for invoice verification, as well as for the automatic creation of the invoice.

In this illustration, the Notify of Invoiced Values from SIR to Purchase Order Processing outbound process agent 824 includes a Notify of Invoiced Values operation 826 of an Invoice Verification Out interface 828 to send a Supplier Invoice Request Invoiced Values Notification message 830 that will be received by components in the Purchase Order Processing process component 802. The notification message is sent to make certain that if parts of a purchase order have been previously posted, the corresponding purchase order is not changed to an amount lower than the one that has already been delivered. Upon receipt of the message, the Invoice Verification In interface 832 includes a Change Purchase Order based on Invoiced Values operation 834, which is included in an Invoice Verification In interface 834 to change appropriate invoiced quantities in the purchase order. The updated change information is sent to the Purchase Order business object 806 using the Change Purchase Order based on Invoiced Values inbound process agent 836.

Interactions Between Process Components "Bank statement creation at bank" and "Payment Processing"

Figure 9:
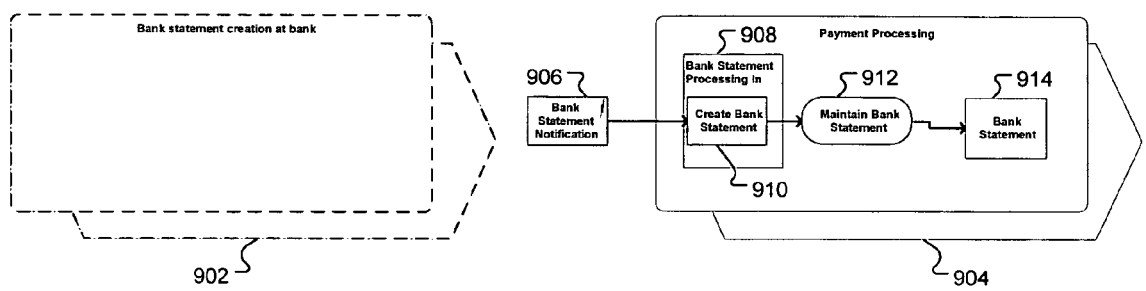
FIG. 9 is a block diagram showing interactions between a Bank statement creation at bank process component and a Payment Processing process component.

FIG. 9 is a block diagram showing interactions between a Bank Statement Creation at Bank process component 902 and a Payment Processing process component 904 in the architectural design of FIG. 1.

As shown in FIG. 9, the bank statement is created at a bank and a Bank Statement Notification message 906 is created.

The Payment Processing process component 904 receives the Bank Statement Notification message 906 into the Bank Statement Processing In interface 908 where a Create Bank Statement operation 910 is invoked to create a bank statement in the Payment Processing process component 904. A Maintain Bank Statement inbound process agent 912 updates the Bank Statement business object 914 with a new or modified bank statement. For example, the bank statement may be a statement for a house bank account where modifications are made when bills are paid.

Interactions Between Process Components "Supplier Invoice Processing" and "Due Item Processing"

Figure 10:
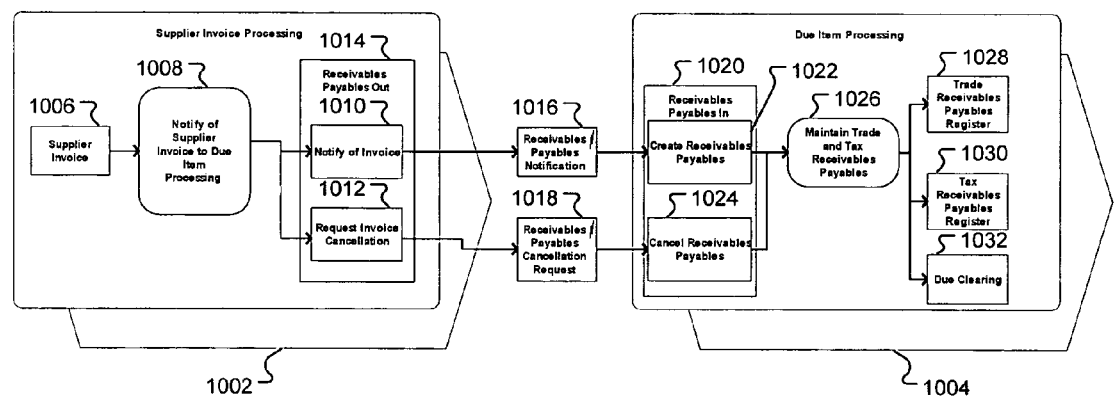
FIG. 10 is a block diagram showing interactions between a Supplier Invoice Processing process component and a Due Item Processing process component.

FIG. 10 is a block diagram showing interactions between a Supplier Invoice Processing process component 1002 and Due Item Processing process component 1004 in the architectural design of FIG. 1.

A Supplier Invoice Processing process component 1002 includes a Supplier Invoice business object 1006 which is a document that states the recipient's (usually the purchaser's) obligation to pay the supplier for goods received or services rendered. The invoice is normally created after the goods and service acknowledgment has been confirmed. The Notify of Supplier Invoice to Due Item Processing outbound process agent 1008 invokes a Notify of Invoice operation 1010 to notify the Due Item processing component 1004 about the receivables/payables due for the invoice that has been paid. Alternatively, a Request Invoice Cancellation operation 1012 may be invoked to cancel the previously sent notification for receivables/payables due. Both operations may be used in a Receivables Payables Out interface 1014. If the Notify of Invoice operation 1010 is invoked, then a Receivables Payables Notification message 1016 is sent to the Due Item Processing process component 1004. If the Request Invoice Cancellation operation 1012 is invoked, the Receivables/Payables Cancellation Request message 1018 is sent to the Due Item Processing process component 1004.

The Receivables/Payables Messages are received by a Receivables/Payables In interface 1020 where operations may be performed. If a notification message is received, then a Create Receivables/Payables operation 1022 is performed to create a trade and/or tax receivable or payable. If a cancellation message is received, then a Cancel Receivables/Payables operation 1024 is performed to cancel a trade and/or tax receivable or payable. Cancellations and updates may be sent by a Maintain Trade and Tax Receivables Payables inbound process agent 1026 to one or more of three business objects: a Trade Receivables Payables business object 1028, a Tax Receivables Payables business object 1030, and a Due Clearing business object 1032. The Trade Receivables Payables business object 1028 may register for all trade receivables and payables from goods and services of a company from/to its business partners. The Tax Receivables Payables business object 1030 may register for all tax receivables and payables of a company that are due for delivered goods and rendered services between buyers and sellers, the consumption of goods, and the transfer of goods that are withheld from payments to vendors. The Due Clearing business object 1032 is group of receivables and payables for clearing. "Clearing" means that the amounts of the receivables and payables of a group balance to zero taking cash discounts and other deductions into account. The "group" is typically payments and invoices that belong together, but it can also be credit memos and invoices, or customer and vendor invoices. A group results uniquely from the invoice reference information of a payment.

Interactions Between Process Components "Payment Processing" and "Accounting"

Figure 11:
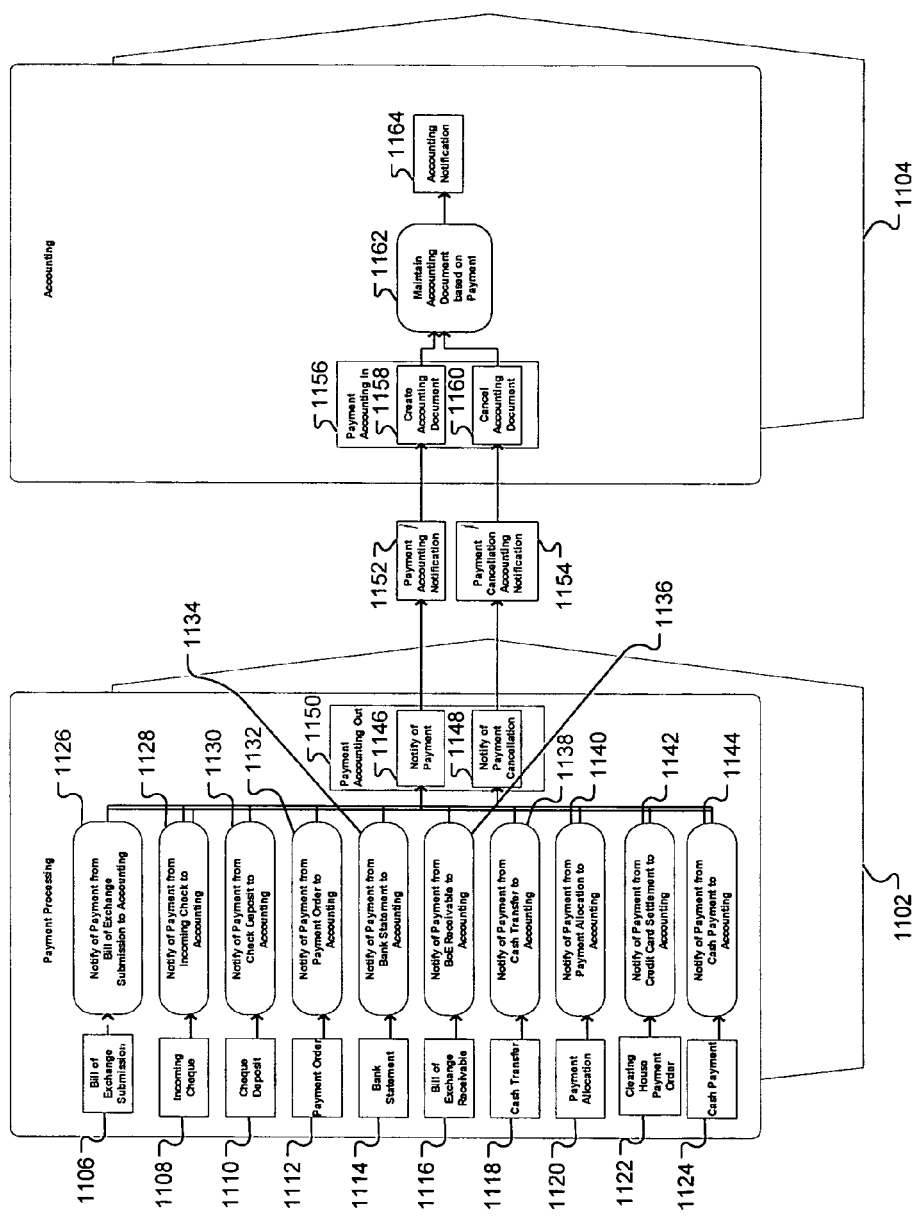
FIG. 11 is a block diagram showing interactions between a Payment Processing process component and an Accounting process component.

FIG. 11 is a block diagram showing interactions between a Payment Processing process component 1102 and an Accounting process component 1104 in the architectural design of FIG. 1.

The Payment Processing process component 1102 includes ten business objects: a Bill of Exchange Submission business object 1106, an Incoming Check business object 1108, a Check Deposit business object 1110, a Payment Order business object 1112, a Bank Statement business object 1114, a Bill of Exchange Receivable business object 1116, a Cash Transfer business object 1118, a Payment Allocation business object 1120, a Clearing House Payment Order business object 1122, and a Cash Payment business object 1124

The Bill of Exchange Submission business object 1106 sends incoming bill of exchange receivables to the house bank for cashing. The Incoming Check business object 1108 represents a check sent by a business partner. The incoming check will be sent to the house bank by a check deposit. The Check Deposit business object 1110 sends a collection of incoming checks to the house bank for cashing. The Payment Order business object 1112 creates payment media for either a bank, a credit card a settlement institute, or a business partner on the base of payment requests. The Bank Statement business object 1114 is a bank statement for a house bank account. The Bill of Exchange Receivable business object 1116 represents a Bill of Exchange received from a business partner or a Bill of Exchange Request sent to a business partner. The Cash Transfer business object 1118 is a document that shows an internal money transfer between: a bank account and bank account (bank transfer), a cash account and bank account (cash deposit), a bank account and cash account (cash withdrawal), or a cash account and cash account (cash transfer). The Payment Allocation business object 1120 documents a process step by which open payments of different types belonging to one another are indicated as confirmed or sent to other components for post processing. For example, an incoming check may confirm a payment advice or a bank statement item may confirm a check deposit. The Clearing House Payment Order business object 1122 is an order document for clearing a collection of credit card payments to the clearing house. The Cash Payment business object 1124 is a document showing an incoming or outgoing cash payment from or to a business partner.

The Payment Processing process component 1102 also includes a number of outbound process agents, each tied to a particular business object. A Notify of Payment from Bill of Exchange Submission to Accounting outbound process agent 1126 creates an accounting notification from the Bill of Exchange Submission business object 1106. A Notify of Payment from Incoming Check to Accounting outbound process agent 1128 may notify the Accounting process component 1104 of a bounced or cancelled check. A Notify of Payment from Check Deposit to Accounting outbound process agent 1130 may notify the Accounting process component 1104 of a change in status of a check deposit. For example, a notification may be sent stating that a deposit is ready for transfer to another account. A Notify of Payment from Payment Order to Accounting outbound process agent 1132 may notify the Accounting process component 1104 of a payment by payment order or a cancellation of payment. A Notify of Payment from Bank Statement to Accounting outbound process agent 1134 may notify the Accounting process component 1104 of a payment by bank account or a cancellation of payment. A Notify of Payment from Bill of Exchange Receivable to Accounting outbound process agent 1136 may notify the Accounting process component 1104 of a payment made by a bill of exchange or a cancellation of payment. A Notify of Payment from Cash Transfer to Accounting outbound process component 1138 may notify the Accounting process component 1104 about a transfer of money between house bank accounts and/or cash accounts or a cancellation of payment. A Notify of Payment from Payment Allocation to Accounting outbound process agent 1140 may notify the Accounting process component 1104 of a payment made by a payment allocation or a cancellation of payment. A Notify of Payment from Credit Card Settlement to Accounting outbound process agent 1142 may notify the Accounting process component 1104 of a payment made by credit card or a cancellation of payment. A Notify of Payment from Cash Payment to Accounting outbound process agent 1144 may notify the Accounting process component 1104 of a payment made by cash or a cancellation of a payment.

The outbound process agents above may cause invocation of a Notify of Payment operation 1146 or a Notify of Request Payment Cancellation operation 1148 to update accounting. The operations may be included in a Payment Accounting Out interface 1150. The Payment Accounting Out interface 1150 may send a Payment Accounting Notification message 1152 or a Payment Cancellation Accounting Request message 1154 to a Payment Accounting In interface 1156 in the Accounting process component 1104. The Payment Accounting In interface 1156 includes a Create Accounting Document operation 1158 or a Cancel Accounting Document operation 1160, depending on the message received. A Maintain Accounting Document based on Payment inbound processing component 1162 updates the Accounting Notification business object 1164. An accounting notification is a common input channel for all kinds of operational business transactions into financial accounting that is called by operational components in order to record the business transactions in financial accounting.

Interactions Between Process Components "Purchase Order Processing" and "Sales Order Processing at Supplier"

Figure 12:
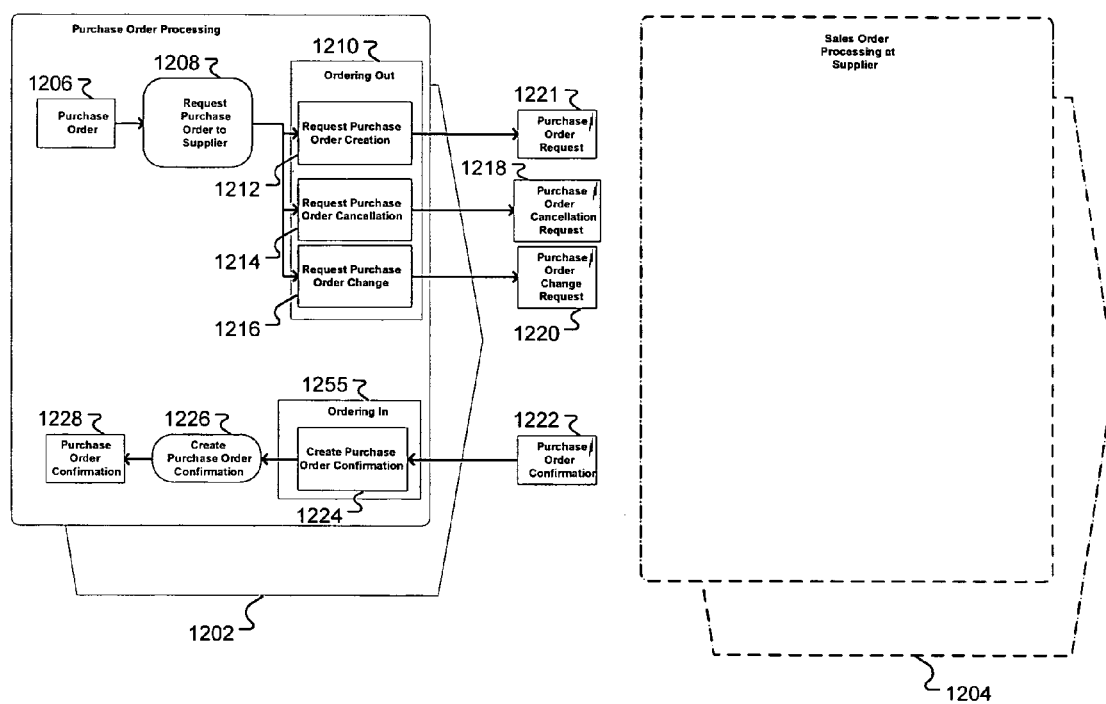
FIG. 12 is a block diagram showing interactions between a Purchase Order Processing process component and a Sales Order Processing at Supplier process component.

FIG. 12 is a block diagram showing interactions between a Purchase Order Processing process component 1202 and a Sales Order Processing at Supplier process component 1204 in the architectural design of FIG. 1.

As shown in FIG. 12, the Purchase Order Processing process component 1202 includes a Purchase Order business object 1206 which is a request from a purchaser to an external supplier to deliver a specified quantity of goods, or perform a specified service, within a specified time. A Request Purchase Order to Supplier outbound process agent 1208 can request invocation of a Request Purchase Order Creation operation 1212, a Request Purchase Order Cancellation operation 1214, or a Request Purchase Order Change operation 1216. All three operations 1212, 1214, 1216 are included in an Ordering Out interface 1210.

The Request Purchase Order Cancellation operation 1214 requests a cancellation of a purchase order that was formerly ordered at a supplier which creates a Purchase Order Cancellation Request message 1218. The Request Purchase Order Change operation 1216 requests a change of a purchase order that was formerly ordered at the supplier which creates a Purchase Order Change Request message 1220. The Request Purchase Order Creation operation 1212 requests a purchase order from a supplier which creates a Purchase Order Change Request message 1221.

Upon receiving a create, change or cancellation message, the Sales Order Processing process component 1204, a Purchase Order Confirmation message 1222 may be created to update the Purchase Order Processing process component 1202. To complete the update, a Create Purchase Order Confirmation operation 1224, which is included in a Ordering In interface 1225, that transfers the update to the Purchase Order Confirmation business object 1228 using the Create Purchase Order inbound process agent 1226. A Purchase Order Confirmation business object 1228 is a confirmation from an external supplier to the request of a purchaser to deliver a specified quantity of material, or perform a specified service, at a specified price within a specified time.

Interactions Between Process Components "Customer Invoice Processing at Supplier" and "Supplier Invoice Processing"

Figure 13:
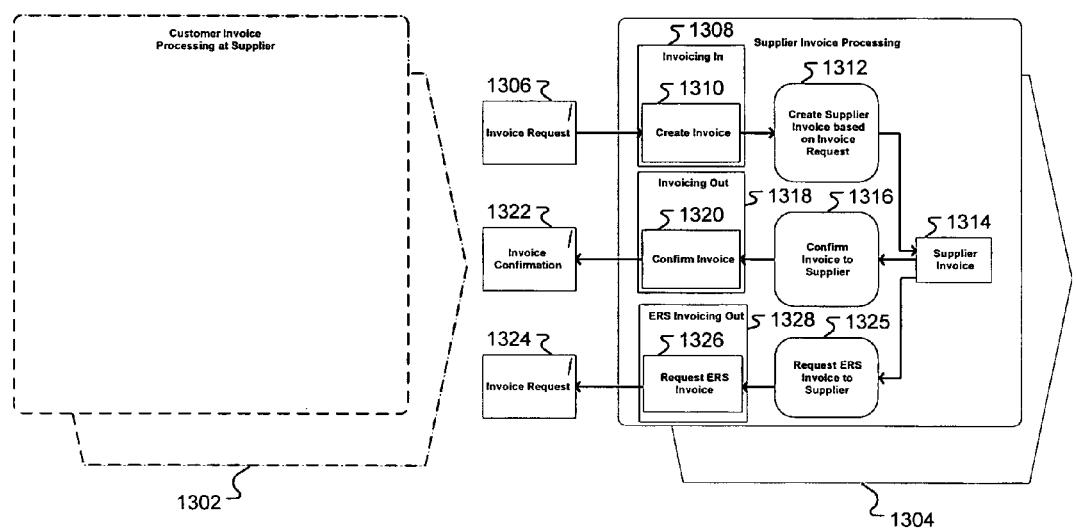
FIG. 13 is a block diagram showing interactions between a Customer Invoice Processing at Supplier process component and a Supplier Invoice Processing component.

FIG. 13 is a block diagram showing interactions between a Customer Invoice Processing at Supplier process component 1302 and a Supplier Invoice Processing process component 1304 in the architectural design of FIG. 1.

The Supplier Invoice Processing process component 1304 receives an Invoice Request message 1306 into an Invoicing In interface 1308 which includes a Create Invoice operation 1310 that creates a supplier invoice based on information received from the supplier or a differing invoicing party. A Create Supplier Invoice based on Invoice Request inbound process agent 1312 updates a Supplier Invoice business object 1314. A Supplier Invoice business object 1314 is a document that states the recipient's (usually the purchaser's) obligation to pay the supplier for goods received or services rendered.

Upon completion of the update, a Confirm Invoice to Supplier outbound process agent 1316 invokes a Confirm Invoice operation 1320. The Confirm Invoice operation 1320 is part of an Invoicing Out interface 1318. The Confirm Invoice operation 1320 sends an Invoice Confirmation message 1322 to notify the supplier whether the previously sent invoice is accepted or rejected, depending on the outcome of invoice verification.

The Supplier Invoice business object 1314 may also send a message to the Customer Invoice Processing at Supplier 1302 using a Request Evaluated Receipt Settlement Invoice to Supplier outbound process agent 1325. In this example, an invoice Request message 1324 is also created by a Request an evaluated receipt settlement Invoice operation 1326, which is included in an Evaluated Receipt Settlement Invoicing Out interface 1328.

Interactions Between Process Components "Inbound Delivery Processing" and "Supplier Invoice Processing"

Figure 14:
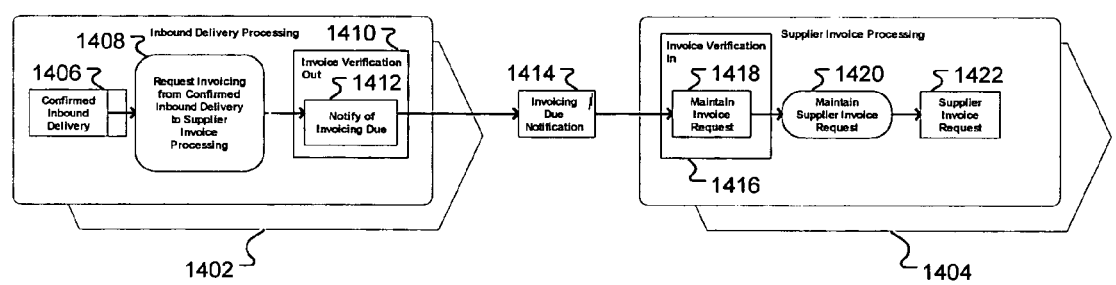
FIG. 14 is a block diagram showing interactions between an Inbound Delivery Processing process component and a Supplier Invoice Processing process component.

FIG. 14 is a block diagram showing interactions between an Inbound Delivery Processing process component 1402 and a Supplier Invoice Processing process component 1404 in the architectural design of FIG. 1.

The Inbound Delivery Processing process component 1402 includes a Confirmed Inbound Delivery business object 1406 which is a document containing the delivery note from the supplier which additionally records the goods that have actually been received. A Request Invoicing from Confirmed Inbound Delivery to Supplier Invoice Processing outbound process agent 1408 sends information to an Invoice Verification Out interface 1410 which includes a Notify of Invoicing Due operation 1412. When a goods and service acknowledgment is created, supplier invoice processing needs to be informed because this information is necessary in case of goods receipt based invoice verification. An Invoicing Due Notification message 1414 is generated and transmitted to the Supplier Invoice Processing process component 1404.

Upon receiving the Invoicing Due Notification message 1414, a Maintain Invoice Request operation 1418, which is included in an Invoice Verification In interface 1416, is invoked to create or update a reference object in the Supplier Invoice Processing deployment unit in order to perform invoice verification with reference to a purchase order, for example, without having to access other deployment units. The reference object is used for checks against the preceding documents and to make proposals for invoice entry. A Maintain Supplier Invoice Request inbound process agent 1420 updates a Supplier Invoice Request business object 1422. The Supplier Invoice Request is a document that is sent to invoice verification, advising that an invoice for specified quantities and prices is expected or is to be created through an evaluation settlement. The system uses the invoice request as a basis for invoice verification, as well as for the automatic creation of the invoice.

Interactions Between Process Components "Due Item Processing" and "Accounting"

Figure 15:
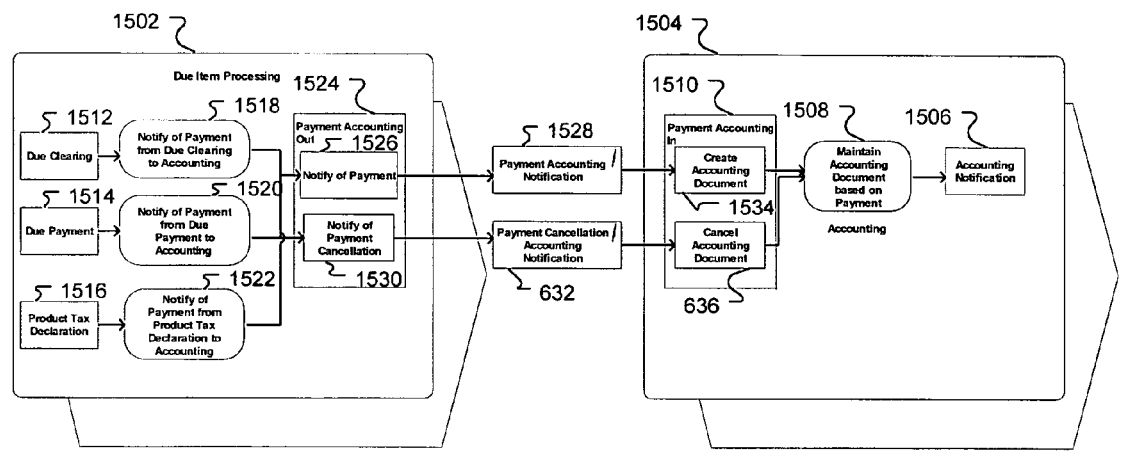
FIG. 15 is a block diagram showing interactions between a Due Item Processing component and an Accounting process component.

FIG. 15 is a block diagram showing interactions between a Due Item Processing process component 1502 and an Accounting process component 1504 in the architectural design of FIG. 1. The Accounting process component 1504 contains an Accounting Notification business object 1506, a Maintain Accounting Document based on Payment inbound process agent 1508, and a Payment Accounting In interface 1510. The Accounting Notification business object 1506 represents a common input channel for recording some or all operational business transactions into financial accounting.

The Due Item Processing process component 1502 contains three business objects, three outbound process agents, and one interface. The three business objects include: a Due Clearing business object 1512, a Due Payment business object 1514, and a Product Tax Declaration business object 1516. The outbound process agents include: a Notify of Payment from Due Clearing to Accounting outbound process agent 1518, a Notify of Payment from Due Payment to Accounting outbound process agent 1520, and a Notify of Payment from Product Tax Declaration to Accounting outbound process agent 1522. The interface is a Payment Accounting Out interface 1524.

The Due Clearing business object 1512 represents a group of receivables and payables for clearing. "Clearing" means that the amounts of the receivables and payables of a group balance to zero taking cash discounts and other deductions into account. The "group" is typically payments and invoices that belong together, but it can also be credit memos and invoices, or customer and vendor invoices. A group results uniquely from the invoice reference information of a payment.

The Due Payment business object 1514 represents payment requests for payment processing. This can be done manually or automatically. In contrast to payment requests from Human Capital Management solution, or Treasury, Due Payment is responsible for the payment and clearing of payables and receivables from goods and services.

The Product Tax Declaration business object 1516 represents the product tax liabilities/receivables of a company to the responsible tax authority according to the tax declaration arrangement and country specific legal requirements that triggers the payment to the tax authority.

Any of the three business objects 1512, 1514, 1516 may initiate a payment notification. In one type of interaction, the Due Clearing business object 1512 first sends a request for payment notification to the Notify of Payment from Due Clearing to Accounting outbound process agent 1518. For example, the request may be to send notification for a clearing of trade receivables and/or payables to accounting. Here, the Notify of Payment from Due Clearing to Accounting outbound process agent 1518 invokes a Notify of Payment operation 1526 provided by the Payment Accounting Out interface 1524. Upon completion of the operation, the Notify of Payment operation 1526 transmits a Payment Accounting Notification message 1528 requesting the accounting entry be made. In another type of interaction, the Due Payment business object 1514 first sends a request for payment notification to the Notify of Payment from Due Payment to Accounting outbound process agent 1520. In another type of interaction, the request may be to send notification to accounting for inward or outward trade receivables and/or payables payments. Here, the process agent 1520 invokes the Notify of Payment operation 1526 to transmit a Payment Accounting Notification message 1528, requesting the accounting entry be made. In another type of interaction, the Product Tax Declaration business object 1516 first sends a request for payment notification to the Notify of Payment from Product Tax Declaration to Accounting outbound process agent 1522. For example, the request may be to send notification for a payment of tax receivables and/or payables to accounting. Here, the process agent 1522 invokes a Notify of Payment operation 1526 to transmit a Payment Accounting Notification message 1528, requesting the accounting entry be made.

The Due Clearing business object 1512 and the Accounting business object 1514 may initiate a payment cancellation. In one type of interaction, the Due Clearing business object 1512 first sends a request for payment cancellation to the Notify of Payment from Due Clearing to Accounting outbound process agent 1518. For example, the request may be to send cancellation for a clearing of trade receivables and/or payables to accounting. Here, the Notify of Payment from Due Clearing to Accounting outbound process agent 1518 invokes the Request Payment Cancellation operation 1530 provided by the Payment Accounting Out interface 1524. Upon completion of the operation, the Request Payment Cancellation operation 1530 transmits the Payment Accounting Cancellation Request message 1532 requesting the accounting entry be made. In another type of interaction, the Due Payment business object 1514 first sends a request for payment cancellation to the Notify of Payment from Due Payment to Accounting outbound process agent 1520. For example, the request may be to send cancellation to accounting for inward or outward trade receivables and/or payables payments. Here, the process agent invokes the Request Payment Cancellation operation 1530 provided by the Payment Accounting Out interface 1524. Upon completion of the operation, the Request Payment Cancellation operation 1530 transmits a Payment Accounting Cancellation Request message 1532 requesting the accounting entry be made.

The Payment Accounting Notification message 1528 and the Payment Accounting Cancellation Request message 1532 initiate payment accounting within the Accounting process component 1504. For payment notifications, the Payment Accounting Notification message 1528 is received by a Create Accounting Document operation 1534 provided by the Payment Accounting In interface 1510. Here, the operation 1534 sends a request to the Maintain Accounting Document based on Payment inbound process agent 1508, which updates the Accounting Notification business object 1506. For example, the accounting documents are updated to show payment has been made. Similarly, for payment cancellations, the Payment Accounting Cancellation Request message 1532 is received by a Cancel Accounting Document operation 1536 provided by the Payment Accounting In interface 1510. Here, the operation 1536 sends a request to the Maintain Accounting Document based on Payment inbound process agent 1508, which updates the Accounting Notification business object 1506. For example, the accounting documents are updated to show payment has been cancelled.

Interactions Between Process Components "RFQ Processing" and "Opportunity/Customer Quote Processing at Supplier"

Figure 16:
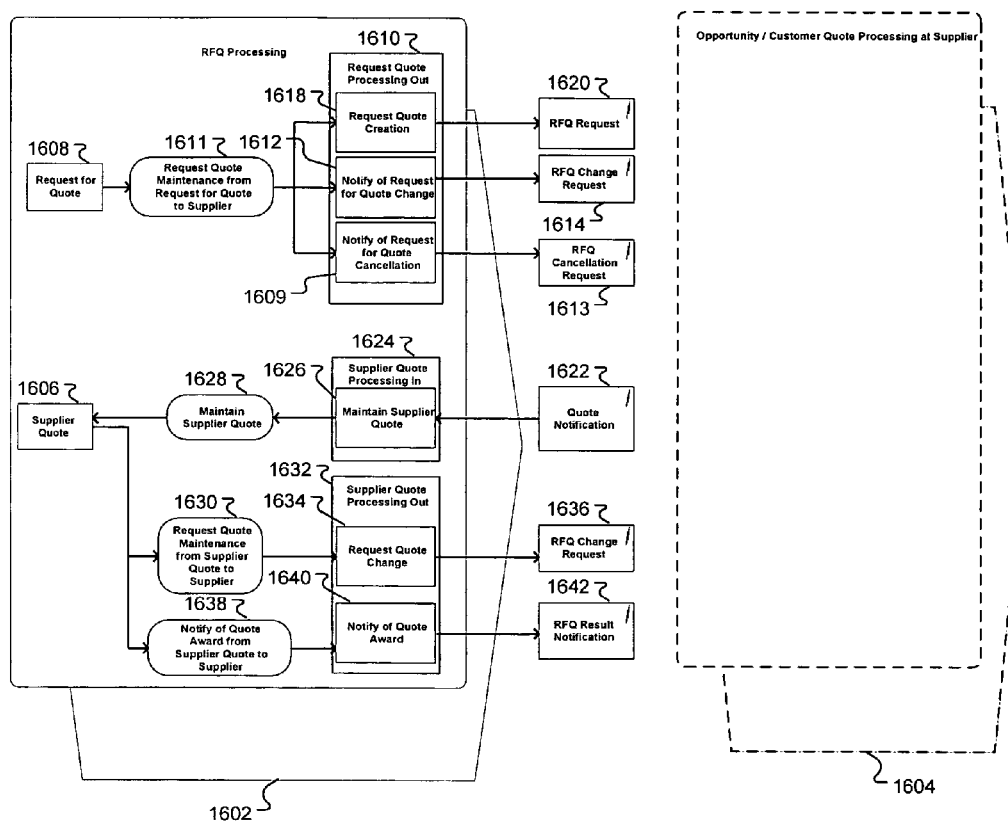
FIG. 16 is a block diagram showing interactions between an RFQ Processing process component and an Opportunity/Customer Quote Processing at Supplier process component.

FIG. 16 is a block diagram showing interactions between an RFQ process component 1602 and an Opportunity/Customer Quote Processing at Supplier process component 1604 in the architectural design of FIG. 1.

The RFQ process component 1602 includes two business objects. A Supplier Quote business object 1606 is a response to a Request for Quote, in which a supplier offers to sell materials and services according to the requested criteria. A Request for Quote business object 1608 is a request from a buyer to a bidder to submit a quote for a material or a service according to specified criteria.

A Request Quote Maintenance from Supplier Quote to Supplier outbound process agent 1611 updates an interface when a Request for Quote has been changed or Supplier Quote is sent back to Supplier.

A Request Quote Processing Out interface 1610 includes a Notify of Request for Quote Cancellation operation 1609 that sends the changes of a published Request for Quote to a supplier to participate in the further request for quote processes thereby generating a Request for Quote Cancellation Request message 1613. The Request Quote Processing Out interface 1610 may also include a Notify of Request for Quote Change operation 1612 that sends the Request for Quote to a supplier to participate in a request for quote processes thereby generating an Request for Quote Change Request message 1614.

Additionally, the Request Quote Processing Out interface 1610 includes a Request Quote Creation operation 1618 that creates the quote, thereby generating a Request for Quote Request message 1620.

The Opportunity/Customer Quote Processing at Supplier process component 1604 may generate messages which continue processing events in the RFQ Processing process component 1602.

A Quote Notification message 1622 may be received in the Supplier Quote Processing In interface 1624, and a Maintain Supplier Quote operation 1626 may update a Supplier Quote business object 1606 using a Maintain Supplier Quote inbound process agent 1628.

The Supplier Quote business object 1606 may use a Request Quote Maintenance from Request for Quote to Supplier outbound process agent 1630 to update the status of a quote to 'Accepted' or 'Rejected.' A Supplier Quote Processing Out interface 1632 includes a Request Quote Change operation 1634, thereby generating an RFQ Change Request message 1636.

Alternatively, the Supplier Quote business object 1606 may use a Notify of Quote Award from Supplier Quote to Supplier outbound process agent 1638 to check if a request for quote is published, re-published or cancelled. The Notify of Quote Award operation 1640 may then send acceptance or final rejection of the quote to the supplier via an RFQ Result Notification message 1642.

Interactions Between Process Components "Purchase Order Processing" and "External Procurement Trigger and Response"

Figure 17:
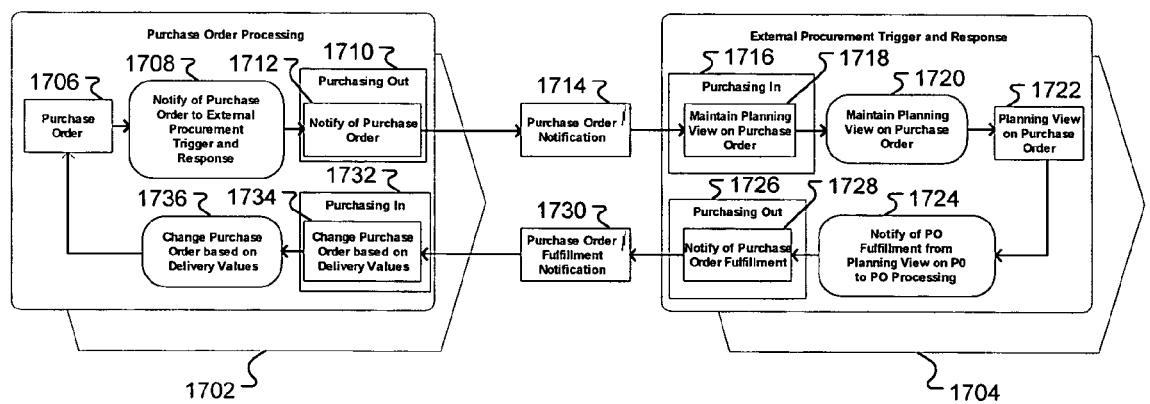
FIG. 17 is a block diagram showing interactions between a Purchase Order Processing process component and an External Procurement Trigger and Response process component.

FIG. 17 is a block diagram showing interactions between a Purchase Order Processing process component 1702 and an External Procurement Trigger and Response process component 1704 in the architectural design of FIG. 1. A Purchase Order business object 1706 is a request from a purchaser to an external supplier to deliver a specified quantity of goods, or perform a specified service, within a specified time.

The request uses a Notify of Purchase Order to external Procurement Trigger and Response outbound process agent 1708 to send a notification about created, changed or cancelled purchase orders. The notification is sent into a Purchasing Out interface 1710 that includes a Notify of Purchase Order operation 1712 that notifies from a planning system to a purchaser about posting of goods receipt (fulfillment of a Purchase Order). A Purchase Order Notification message 1714 is then generated and sent to the External Procurement Trigger and Response process component 1704.

The notification message 1714 is received in a Purchasing In interface 1716 that includes a Maintain Planning View on Purchase Order operation 1718. The operation 1718 updates the planning relevant data of the Purchase Order. An update is sent using the Maintain Planning View on Purchase Order inbound process agent 1720. The Planning View on Purchase Order business object 1722 is an object that represents the purchase order.

A Purchasing Out interface 1726 receives a notification form the Planning View on Purchase Order business object 1722 by means of a Notify of PO Fulfillment from Planning View on PO to PO Processing outbound process agent 1724, which sends Purchase Order Fulfillment data to purchasing when new inventories (planning view) are posted. A Notify of Purchase Order Fulfillment operation 1728 is invoked, and a Purchase Order Fulfillment Notification message 1730 is generated. The message 1730 is received in the Purchasing In interface 1732. The interface 1732 includes a Change Purchase Order based on Delivery Values operation 1734 that may change the Delivered Quantity of the Purchase Order.

The update is sent to the Purchase Order business object 1706 using a Change Purchase Order based on Delivery Values inbound process agent 1736.

Interactions Between Process Components "Payment Processing" and "Payment Order Processing at House Bank"

Figure 18:
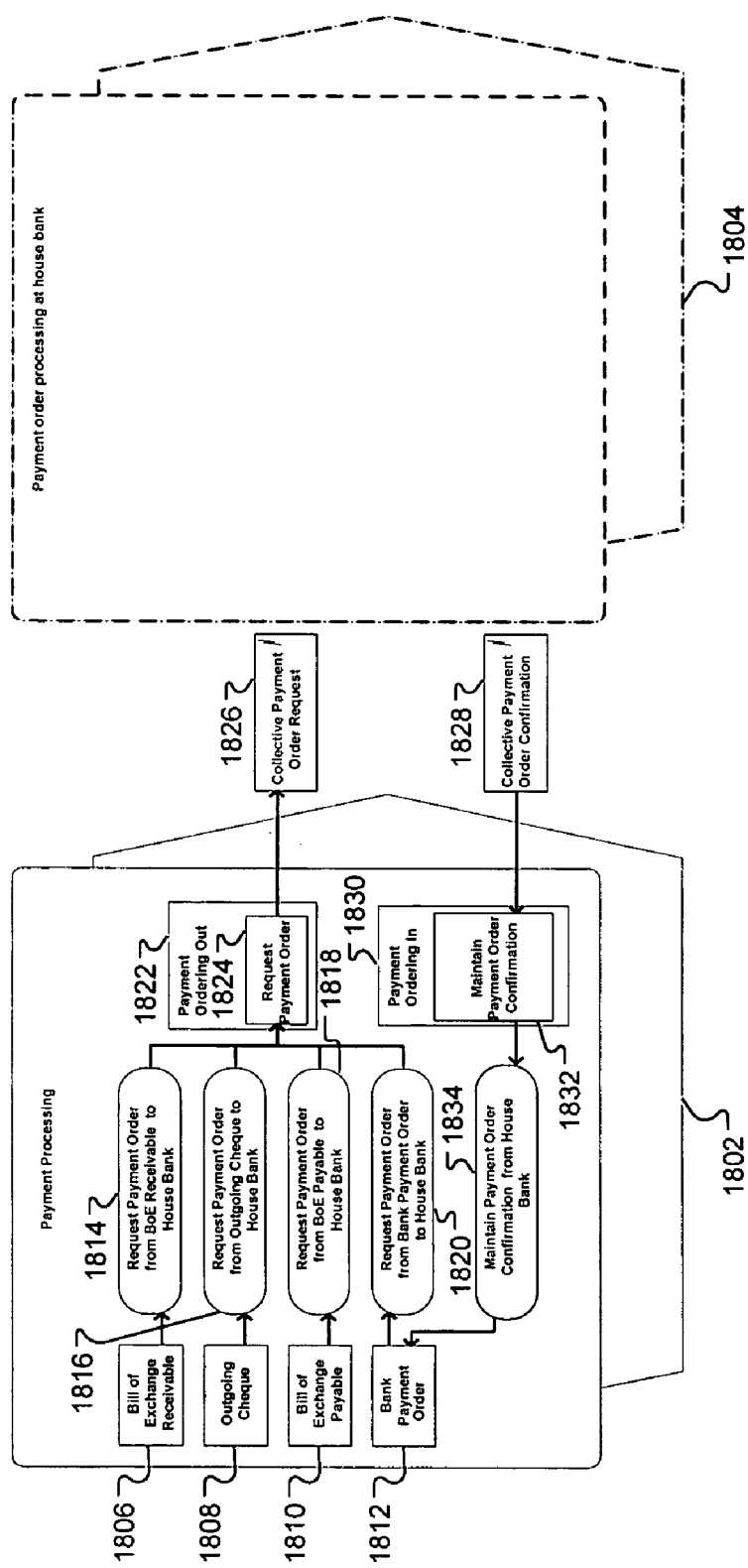
FIG. 18 is a block diagram showing interactions between a Payment Processing process component and a Payment order processing at house bank process component.

FIG. 18 is a block diagram showing interactions between a Payment Processing process component 1802 and a Payment Order processing at house bank process component 1804 in the architectural design of FIG. 1.

The Payment Processing process component 1802 includes four business objects: a Bill of Exchange Receivable business object 1806 that represents a Bill of Exchange received from or a Bill of Exchange Request sent to a business partner, an Outgoing Check business object 1808 that represents a check sent to a business partner that is created via payment order, a Bill of Exchange Payable business object 1810 that represents a Bill of Exchange sent to a business partner that is created only via payment order, and a Bank Payment Order business object 1812 which is a Payment Order that will be sent to a house bank and may contain bank transfers as well direct debits.

A Request Payment Order from BoE Receivable to House Bank outbound process agent 1814 creates an electronic Bill of Exchange Receivable (Request). A Request Payment Order from Outgoing Check to House Bank outbound process agent 1816 creates an outgoing check to be printed externally. A Request Payment Order from BoE Payable to House Bank outbound process agent 1818 creates an electronic Bill of Exchange Payable. A Request Payment Order from Bank Payment Order to House Bank outbound process agent 1820 creates a Payment order to the House Bank.

A Payment Ordering out interface 1822 receives the updates from the outbound process agents 1814, 1816, 1818, 1820. A Request Payment Order operation 1824 collects Bank Transfers or Direct Debits for payment submission to the business partner. A Collective Payment Order Request message 1826 is generated and processed by the Payment order processing at house bank process component 1804. Upon completion of processing, a Collective Payment Order Confirmation message 1828 is sent to the Payment Ordering In interface 1830 that includes a Maintain Payment Order Confirmation operation 1832 to confirm the status updates from processing a payment order. After completing the operation 1832, an update is sent to the Bank Payment Order business object 1812 using a Maintain Payment Order Confirmation from House Bank inbound process agent 1834.

Interactions Between Process Components "Logistics Execution Control" and "Site Logistics Processing"

Figure 19:
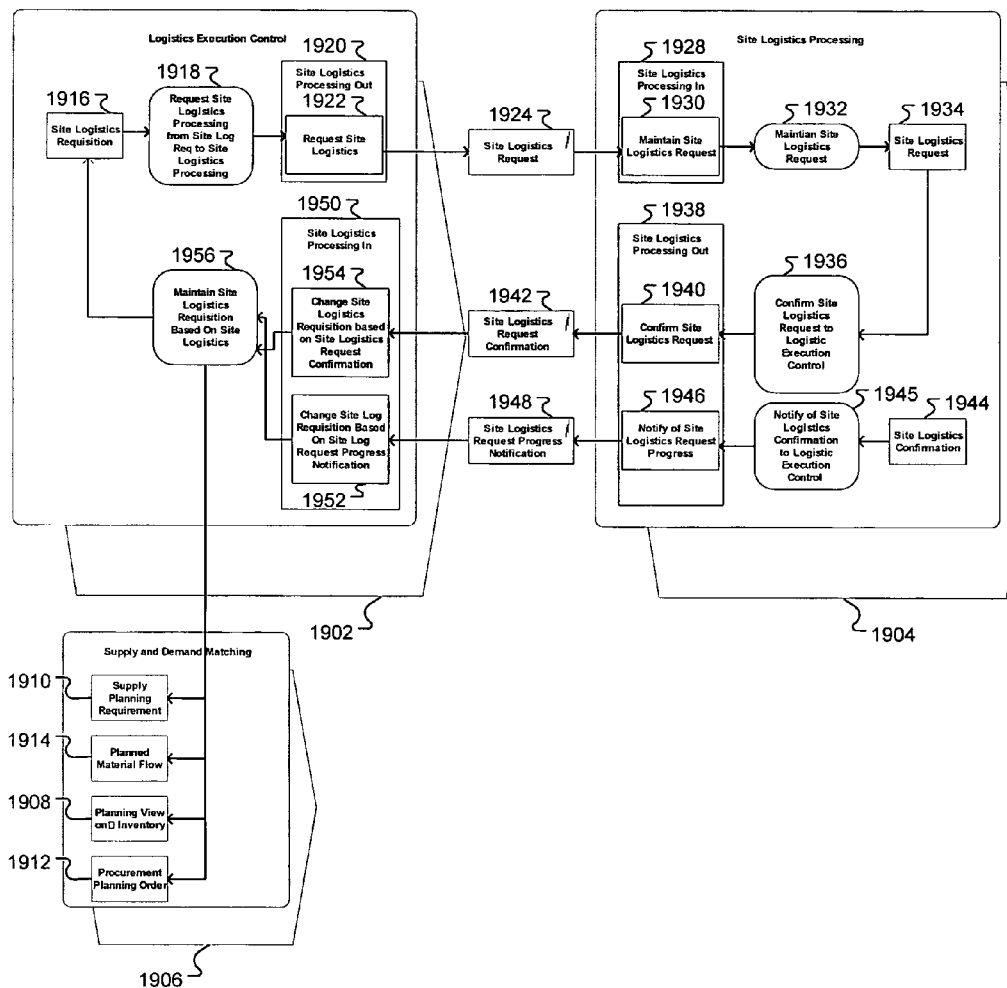
FIG. 19 is a block diagram showing interactions between a Logistics Execution Control process component and a Site Logistics Processing process component.

FIG. 19 is a block diagram showing interactions between a Logistics Execution Control process component 1902 and a Site Logistics Processing process component 1904 in the architectural design of FIG. 1.

Four business objects from the Demand Matching process component 1906 are used in the Logistics execution Demand process component 1902: A Planning View on Inventory business object 1908 is a planning view on Inventory is an object that represents the inventory object from logistics execution. A Supply Planning Requirement business object 1910 is a requirement object that is used as the target for the supply planning run and the availability check. A Procurement Planning Order business object 1912 defines the requested or expected material receipt in a specific quantity and at a specific availability date. A Planned Material Flow business object 1914 defines the relationship between material receipt elements (stock, planned order, and a production order, purchase requisition, purchase order etc.) and material requirements elements (sales order, forecast demand, dependent demand, transfer demand) of a material within a location.

A Site Logistics Requisition business object 1916 uses a Request Site Logistics Processing from Site Log Req to Site Logistics Processing outbound process agent 1918 to send an update to the Request Site Logistics Processing process component 1904.

The Site Logistics Processing Out interface 1920 includes a Request Site Logistics operation 1922 to send a request in order to maintain the site logistics request. The Site Logistics Request message 1924 may then be generated and sent to the Site Logistics Processing process component 1904.

A Site Logistics Processing In interface 1928 includes a Maintain Site Logistics Request operation 1930 that creates or updates a Site Logistics Processing Request. A Maintain Site Logistics Request inbound process agent 1932 may send an update into a Site Logistics Request business object 1934. The Site Logistics Request business object 1934 performs Site Logistics operations supporting outbound, inbound and site internal logistics activities at a certain time. A Confirm Site Logistics Request to Logistic Execution Control outbound process agent 1936 may send updated information into a Site Logistics Processing Out interface 1938 which includes a Confirm Site Logistics Request operation 1940 that confirms receipt of request and acknowledges quantities and delivery dates. This operation 1940 generates a Site Logistics Request Confirmation message 1942 which will be sent to update the Logistics Execution Control process component 1902.

A Site Logistics Confirmation business object 1944 may also send updated information into the Logistics Execution Control process component 1902. The Site Logistics Confirmation business object 1944 is a document that collects actual data posted with reference to a site logistics order or site logistics request. The site logistics confirmation updates inventory, finance and planning. A Notify of Site Logistics Confirmation to Logistics Execution Control outbound process agent 1945 invokes a Notify of Site Logistics Request Progress operation 1946 to inform logistics execution control about inventory changes and fulfillment of Site Logistics Processing. A Site Logistics Request Progress Notification message 1948 may be generated to update the Logistics Execution Control process component 1902.

Upon receiving messages 1940 and 1942, the Logistics Execution Control process component 1902 may perform the following operations: 1. The Site Logistics Processing In interface 1950 includes a Change Site Log. Requisition Based On Site Log. Request Progress Notification operation 1952, which notifies Logistics execution control of inventory changes and confirmation of Site Logistics Processing. 2. The Site Logistics Processing In interface 1950 also includes a Change Site Logistics Requisition based on Site Logistics Request Confirmation operation 1954 that receives confirmation data from Site Logistics Request. A Maintain Site Logistics Requisition Based on Site Logistics inbound process agent 1956 may then update the Site Logistics Requisition business object 1916.

Interactions Between Process Components "Demand Planning" and "Demand Forecast Processing"

Figure 20:
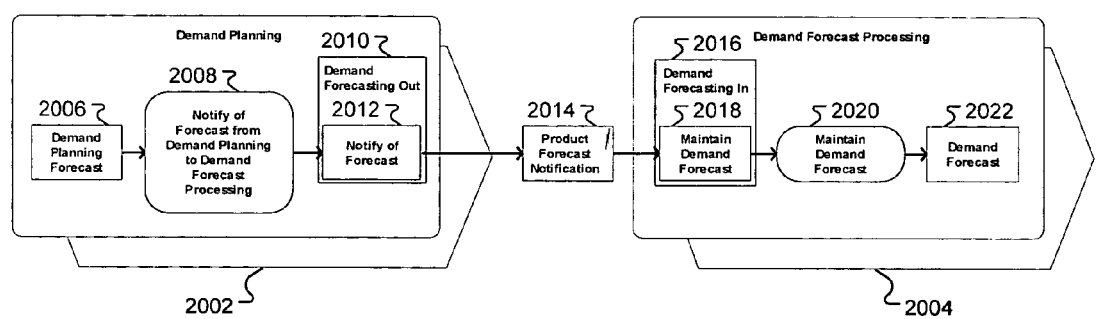
FIG. 20 is a block diagram showing interactions between a Demand Planning process component and a Demand Forecast Processing process component.

FIG. 20 is a block diagram showing interactions between a Demand Planning process component 2002 and a Demand Forecast Processing process component 2004 in the architectural design of FIG. 1.

The process component interaction model begins with a Demand Planning Forecast business object 2006. The Demand Planning Forecast business object 2006 is an object that includes the forecast for a variable grouping of business items (product group, sales organization, for example) which is released for subsequent processes. A forecast notification may be sent using a Notify of Forecast from Demand Planning to Demand Forecast Processing outbound process agent 2008. A Demand Forecast Out interface 2010 receives the notification and may include a Notify of Forecast operation 2012 that sends the current and deleted forecasts using a Product Forecast Notification message 2014. The Demand Forecast Processing process component 2004 receives the notification and invokes a Maintain Demand Forecast operation 2018, in the Demand Forecasting In interface 2016, that creates, updates and deletes the demand forecast object with the given forecast data. Then, a Maintain Demand Forecast inbound process agent 2020 updates the Demand Forecast business object 2022. A Demand Forecast business object 2022 is an object that represents the released demand planning forecasts before they are converted into planned independent requirements.

Interactions Between Process Components "External Procurement Trigger and Response" and "Purchase Request Processing"

Figure 21:
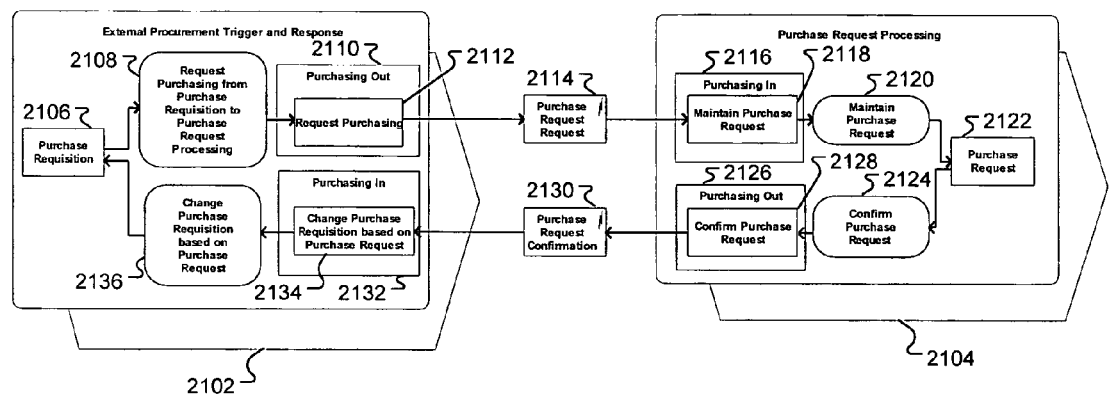
FIG. 21 is a block diagram showing interactions between an External Procurement Trigger and Response process component and a Purchase Request Processing process component.

FIG. 21 is a block diagram showing interactions between an External Procurement Trigger and Response process component 2102 and a Purchase Request Processing process component 2104 in the architectural design of FIG. 1.

A Purchase Requisition business object 2106 is a request or instruction to the purchasing department to purchase specified goods or services in specified quantities within a specified time. The business object 2106 sends the request using a Request Purchasing from Purchase Requisition to Purchase Request Processing outbound process agent 2108. The agent 2108 sends the request information into a Purchasing Out interface 2110 that includes a Request Purchasing operation 2112. The Request Purchasing operation 2112 is a request from a supply planner asking a buyer to procure products/services. The operation 2112 can be used to change a previous request. After completion of the operation 2112, a Purchase Request Request message 2114 is generated.

A Purchasing In interface 2116 in the Purchase Request Processing process component 2104 invokes a Maintain Purchase Request operation 2118 that creates or updates a request from a requestor to a purchaser to (externally) procure products (materials, services). A Maintain Purchase Request inbound process agent 2120 updates a Purchase Request business object 2122. The Purchase Request business object 2122 is a request or instruction to Purchasing to procure a quantity of a material or service so that it is available at a certain point in time.

Upon receiving the update, the business object 2122 sends a confirmation using a Confirm Purchase Request outbound process agent 2124. A Purchasing Out interface 2126 receives the confirmation and includes a Confirm Purchase Request operation 2128 that confirms the creation, change or cancellation of a Purchase Request to the requesting Business Object. A Purchase Request Confirmation message 2130 is generated, and updates are sent to a Purchasing In interface 2132 in the External Procurement Trigger and Response process component 2102. The interface 2132 includes a Change Purchase Requisition based on Purchase Request operation 2134, which is a confirmation of the buyer that informs the requester of the extent to which a requisition has been fulfilled (ordered and rejected quantities). After completion of the operation, a Change Purchase Requisition based on Purchase Request inbound process agent 2136 updates the Purchase Requisition business object 2106.

Interactions Between Process Components "Site Logistics Processing" and "Accounting"

Figure 22:
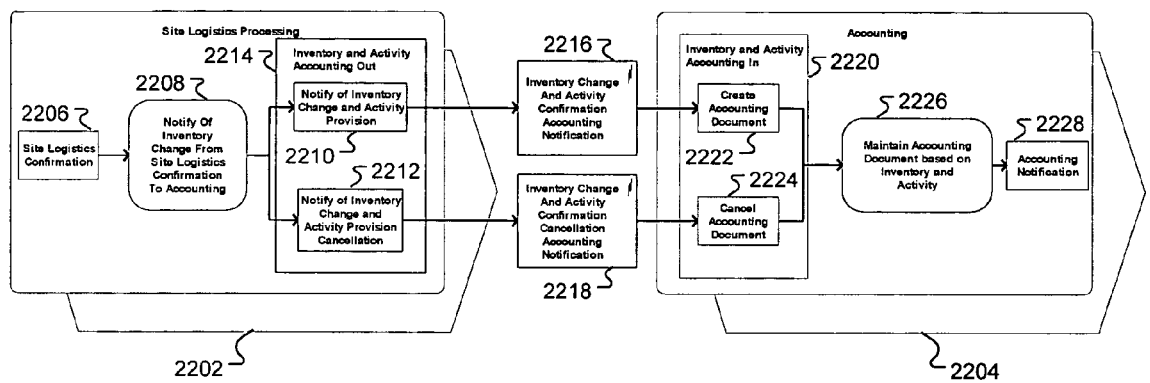
FIG. 22 is a block diagram showing interactions between a Site Logistics Processing process component and an Accounting process component.

FIG. 22 is a block diagram showing interactions between a Site Logistics Processing process component 2202 and an Accounting process component 2204 in the architectural design of FIG. 1. The Site Logistics Processing process component 2202 includes a Site Logistics Confirmation business object 2006, which is a document that collects actual data posted with reference to a site logistics order or site logistics request. The site logistics confirmation updates inventory, finance and planning.

A Notify of Inventory Change from Site Logistics Confirmation to Accounting outbound process agent 2208 invokes a Notify of Inventory Change and Activity Provision operation 2210 to send an Inventory Change Accounting Notification to Accounting. Alternatively, a Notify of Inventory Change and Activity Provision Cancellation operation 2212 may be invoked to request inventory change and activity provision cancellation. Both operations may be used in an Inventory and Activity Accounting Out interface 2214. If the Notify of Inventory Change and Activity Provision operation 2210 is invoked, then an Inventory Change and Activity Confirmation Accounting Notification message 2216 is sent to the Accounting process component 2204. If the Notify of Inventory Change and Activity Provision Cancellation operation 2212 is invoked, an Inventory Change and Activity Confirmation Accounting Cancellation Request message 2218 is sent to the Accounting process component 2204.

The messages 2216 and 2218 are received by an Inventory and Activity Accounting In interface 2220 where operations may be performed. If a notification message is received, then a Create Accounting Document operation 2222 is performed to Receive Inventory Change Accounting Notification from Confirmation and Inventory or Site Logistics Processing or Production. If a cancellation message is received, then a Cancel Accounting Document operation 2224 is performed to cancel requests received from Confirmation and Inventory or Site Logistics Processing or Production process components. Cancellations and updates may be sent by a Maintain Accounting Document based on Inventory and Activity inbound process agent 2226 to update an Accounting Notification business object 2228.

Interactions Between Process Components "RFQ Processing" and "Purchase Order Processing"

Figure 23:
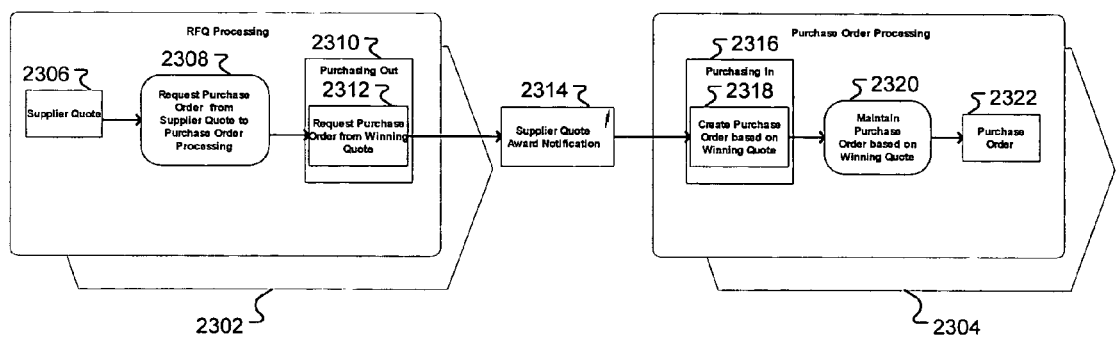
FIG. 23 is a block diagram showing interactions between an RFQ Processing process component and a Purchase Order Processing process component.

FIG. 23 is a block diagram showing interactions between an RFQ Processing process component 2302 and a Purchase Order Processing process component 2304 in the architectural design of FIG. 1.

The process component interaction model begins the RFQ Processing process component 2302 with a Supplier Quote business object 2306 having an update. The Supplier Quote business object 2306 is a response to a Request for Quote, in which a supplier offers to sell materials and services according to the requested criteria. A request may be sent using a Request Purchase Order form supplier Quote to Purchase Order Processing outbound process agent 2308. A Purchasing Out interface 2310 includes a Request Purchase Order from Winning Quote operation 2312 that creates or updates a Purchase Request (Purchase Order) based on accepted Supplier Quote. A Supplier Quote Award Notification message 2314 is sent to a Purchasing In interface 2316 in the Purchase Order Processing process component 2304. A Create Purchase Order based on Winning Quote operation 2318 may be invoked to create a Purchase Order from an accepted Supplier Quote. An update to a Purchase Order business object 2322 will be sent using a Maintain Purchase Order based on Winning Quote inbound process agent 2320.

The Demand Forecast Processing process component 2304 receives the notification and invokes a Maintain Demand Forecast operation 2318 that creates, updates and deletes the demand forecast object with the given forecast data. Then, a Maintain Demand Forecast inbound process agent 2320 updates the Demand Forecast business object 2322. A Demand Forecast business object is an object that represents the released demand planning forecasts before they are converted into planned independent requirements.

Interactions Between Process Components "Supplier Invoice Processing" and "Accounting"

Figure 24:
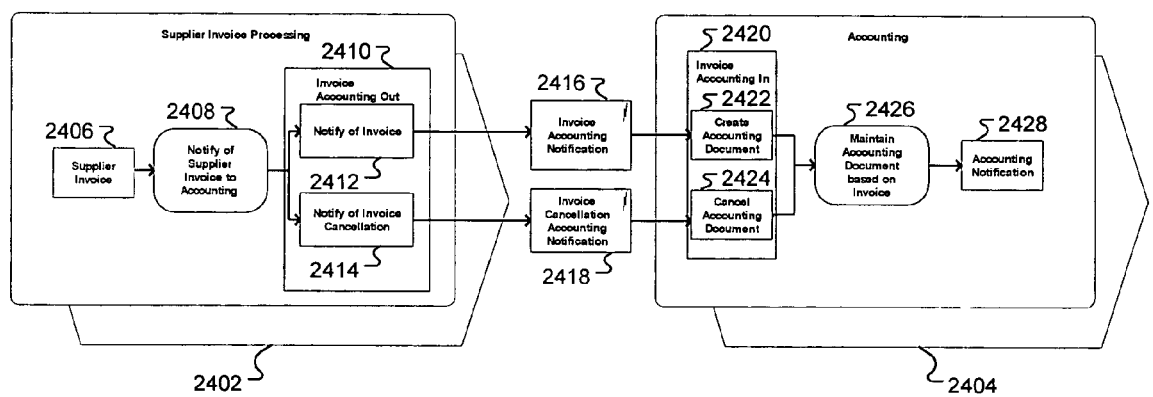
FIG. 24 is a block diagram showing interactions between a Supplier Invoice Processing process component and an Accounting process component.

FIG. 24 is a block diagram showing interactions between a Supplier Invoice Processing process component 2402 and an Accounting process component 2404 in the architectural design of FIG. 1.

As shown in FIG. 24, the Supplier Invoice Processing process component 2402 includes a Supplier Invoice business object 2406. The Supplier Invoice business object 2406 represents a document that states a recipient's obligation to pay a supplier for goods received or services rendered. For example, the supplier invoice may be created after a goods and service acknowledgement has been confirmed. The supplier invoice is then sent into a Notify of Supplier Invoice to Accounting outbound process agent 2408, which notifies accounting of the existence of the supplier invoice. For example, once the supplier invoice is posted to the system, the outbound processing agent sends a notification to accounting stating the supplier invoice has been posted.

The processing agent provides an Invoice Accounting Out interface 2410 with the notification and additional data such as invoice billing numbers or a credit memo. Here, the interface includes a Notify of Invoice operation 2412 and a Notify of Invoice Cancellation operation 2414. The Notify of Invoice operation 2412 may be invoked if the Invoice Accounting Out interface 2410 receives a notification to post an invoice. Upon performing the Notify of Invoice operation 2412, the Invoice Accounting In interface 2410 sends an Invoice Accounting Notification message 2416 with the invoice accounting notification. Alternatively, the Notify of Invoice Cancellation operation 2414 may be invoked if the Invoice Accounting In interface 2410 receives information requesting a cancellation. For example, the Notify of Invoice Cancellation operation 2414 may be invoked in order to cancel an invoice. Upon performing the Notify of Invoice Cancellation operation 2414, an Invoice Cancellation Accounting Notification message 2418 is transmitted with the invoice accounting cancellation request.

The Accounting process component 2404 includes an Invoice Accounting In interface 2420 that may receive messages sent by the Supplier Invoice Processing process component 2404. Here, the Invoice Accounting In interface 2420 includes a Create Accounting Document operation 2422 that creates an accounting document for a customer invoice or supplier invoice if accounting receives the Invoice Accounting Notification message 2416. The Invoice Accounting In interface 2420 also includes a Cancel Accounting Document operation 2424 that cancels a customer or supplier invoice.

The Accounting process component 2404 includes a Maintain Accounting Document based on Invoice inbound process agent 2426 that can maintain accounting documents. For example, the inbound process agent may update the accounting document if a creation or cancellation operation is received. After updating the accounting document, the inbound process agent may forward information about the updated document into an Accounting Notification business object 2428. The Accounting Notification business object 2428 may receive input from operational business transactions, such as the invoice notification above, and record the business transactions in the Financial Accounting deployment unit.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory tangible machine-readable medium, the instructions operable when executed by at least one processor to:
define a plurality of process components, each of the process components comprising a modular and application-independent package of reusable, granular software implementing a respective and distinct business process, the business process comprising functionality exposed by the process component via at least one service interface, the plurality of process components including:
an Inbound Delivery Processing process component that combines tasks concerning inbound delivery processes and enables communication with a vendor and an invoicing process component;
a Material Inspection Processing process component that provides services related to quality inspection;
a Site Logistics Processing process component that supports preparation and execution tasks concerning internal inventory movement in a warehouse type environment;
a Confirmation and Inventory process component that combines tasks required to confirm inventory changes;
a Purchase Request Processing process component that provides a request or instruction to the purchasing department to purchase specified goods or services in specified quantities within a specified time;
a Purchase Order Processing process component that includes a purchase order business object and a purchase order confirmation business object;
a Purchasing Contract process component that handles an agreement between a purchaser and a supplier that details the supply of goods or the performance of services at agreed conditions;
a Supplier Invoice Processing process component that includes a supplier invoice business object and a supplier invoice request business object;
a Demand Forecast Processing process component that collects demand forecasts for further processing;
a Supply and Demand Matching process component that combines the tasks necessary to ensure that sufficient material receipt elements exist to cover material demand;
an External Procurement Trigger and Response process component that combines the tasks necessary for processing planned external procurement orders and provides an interface to purchasing from a supply planning perspective;
a Logistics Execution Control process component that controls and monitors the supply chain execution activities necessary for the fulfillment of an order; and
define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:
the Logistics Execution Control process component and the Inbound Delivery Processing process component, where the pair-wise interaction between the Logistics Execution Control process component and the Inbound Delivery Processing process component includes the transmission of:
a delivery request fulfillment request message from the Logistics Execution Control process component to the Inbound Delivery Processing process component, the delivery request fulfillment request message instructions to support the control, triggering, and monitoring of supply chain execution activities associated with a requested fulfillment of an order; and
a delivery request fulfillment confirmation message from the Inbound Delivery Processing process component to the Logistics Execution Control process component, the delivery request fulfillment confirmation message containing delivery request fulfillment information associated with a requested fulfillment of an order;
the Purchase Order Processing process component and the Supplier Invoice Processing process component, where the pair-wise interaction between the Purchase Order Processing process component and the Supplier Invoice Processing process component includes the transmission of:
an invoicing due notification message from the Purchase Order Processing process component to the Supplier Invoice Processing process component, the invoicing due notification message comprising a notification to the Supplier Invoice Processing process component to create or update a reference object to perform invoice verification with reference to a purchase order; and
a supplier invoice request invoiced values notification message from the Supplier Invoice Processing process component to the Purchase Order Processing process component, the supplier invoice request invoiced values notification message confirming that a corresponding purchase order is not changed to an amount lower than an already-delivered purchase order if parts of a purchase order have been previously posted;
the Purchase Order Processing process component and the Sales Order Processing at Supplier process component;
the Customer Invoice Processing process component and the Supplier Invoice Processing component;
the Inbound Delivery Processing process component and the Supplier Invoice Processing process component, where the pair-wise interaction between the Inbound Delivery Processing process component and the Supplier Invoice Processing process component includes the transmission of:

an invoicing due notification message from the Inbound Delivery Processing process component to the Supplier Invoice Processing process component, the invoicing due notification message notifying the Supplier Invoice Processing process component of the creation of a goods and service acknowledgement;

the Purchase Order Processing process component and the External Procurement Trigger and Response process component, where the pair-wise interaction between the Purchase Order Processing process component and the External Procurement Trigger and Response process component includes the transmission of:
  a purchase order notification message from the Purchase Order Processing process component to the External Procurement Trigger and Response process component, the purchase order notification message providing the External Procurement Trigger and Response process component with notifications from a planning system about postings of goods receipts and the fulfillment of a purchase order; and
  a purchase order fulfillment notification message from the External Procurement Trigger and Response process component to the Purchase Order Processing process component, the purchase order fulfillment notification message providing the Purchase Order Processing process component with purchase order fulfillment data when new inventories are posted;

the Logistics Execution Control process component and the Site Logistics Processing process component, where the pair-wise interaction between the Logistics Execution Control process component and the Site Logistics Processing process component includes the transmission of:
  a site logistics request message from the Logistics Execution Control process component to the Site Logistics Processing process component, the site logistics request message comprising a request to maintain a site logistics request; and
  a site logistics request confirmation message from the Site Logistics Processing process component to the Logistics Execution Control process component, the site logistics request confirmation message confirming receipt of a site logistics request message and acknowledging quantities and delivery dates associated with the site logistics request; and the External Procurement Trigger and Response process component and the Purchase Request Processing process component, where the pair-wise interaction between the External Procurement Trigger and Response process component and the Purchase Request Processing process component includes the transmission of:
  a purchase request message from the External Procurement Trigger and Response process component to the Purchase Request Processing process component, the purchase request message representing a request from a supply planner to a buyer to procure products and/or services for the supply planner; and
  a purchase request confirmation message from the Purchase Request Processing process component to the External Procurement Trigger and Response process component, the purchase request confirmation message confirming receipt of the purchase request; and store the defined process components and service interface in memory.

2. The computer program product of claim 1, wherein the plurality of process components further includes:
  an Accounting process component that records relevant business transactions;
  a Due Item Processing process component that manages payables, receivables from service and supply and corresponding sales;
  a Payment Processing process component that handles incoming and outgoing payments;
  an RFQ Processing process component that includes a request for response business object and a quote business object; and
  a Demand Planning process component that combines the tasks required to anticipate future demand; and
wherein
the pair-wise interactions between pairs of the process components further include interactions between:
  the Purchase Order Processing process component and the Accounting process component;
  the Payment Processing process component and the Accounting process component;
  the Due Item Processing component and the Accounting process component;
  the Site Logistics Processing process component and the Accounting process component;
  the Supplier Invoice Processing process component and the Accounting process component;
  the Due Item Processing process component and the Payment Processing process component;
  the Supplier Invoice Processing process component and the Due Item Processing process component;
  the Purchase Request Processing process component and the RFQ Processing process component;
  the RFQ Processing process component and the Purchase Request Processing process component;
  the Demand Planning process component and the Demand Forecast Processing process component;
  the RFQ Processing process component and the Opportunity/Customer Quote Processing at Supplier process component; and
  the RFQ Processing process component and the Purchase Request Processing process component.

3. The computer program product of claim 2, wherein:
each of the plurality of process components is assigned to no more than one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

4. The computer program product of claim 3, wherein the deployment units comprise:
  a Financial Accounting deployment that includes the Accounting process component;
  a Logistics Execution deployment unit that includes the Inbound Delivery Processing process component, the Material Inspection Processing process component, the Site Logistics Processing process component, and the Confirmation and Inventory process component;

a Purchasing deployment unit that includes the Purchase Request Processing process component, the Purchase Order Processing process component Purchase Order Processing process component Purchase Order Processing process component, and the Purchasing Contract process component;

a Supplier Invoicing deployment unit that includes the Supplier Invoice Processing process component;

a Payment deployment unit that includes the Payment Processing process component;

a Request for Quote deployment unit that includes the RFQ Processing process component;

a Due Item Management deployment unit that includes the Due Item Processing process component;

a Supply Chain Control deployment unit that includes the Demand Forecast Processing process component, the Supply and Demand Matching process component, the External Procurement Trigger and Response process component, and the Logistics Execution Control process component; and an Integrated Business Planning deployment unit that includes the Demand Planning process component.

5. The computer program product of claim 1, wherein:
each of the process components includes at least one business object; and
none of the business objects of any one of the process components interacts directly with any of the business objects included in any of the other process components.

6. The computer program product of claim 5, wherein the business objects comprise a business process object.

7. The computer program product of claim 5, wherein:
none of the business objects included in any one of the process components is included in any of the other process components.

8. The computer program product of claim 1, further comprising:
a plurality of process agents, each process agent being either an inbound process agent or an outbound process agent, an inbound process agent being operable to receive a message from an inbound operation, an outbound process agent being operable to cause an outbound operation to send a message, and each process agent being associated with exactly one process component.

9. The computer program product of claim 8, wherein:
the inbound process agents comprise a first inbound process agent operable to start the execution of a step requested in a first inbound message by creating or updating at least one business object instance.

10. The computer program product of claim 8, wherein:
the outbound process agents comprise a first asynchronous outbound process agent that is called after a business object that is associated with the first outbound process agent changes.

11. The computer program product of claim 1, wherein the operations comprise synchronous and asynchronous operations.

12. A system, comprising:
a computer system comprising at least one hardware platform for executing a computer software application, the computer software application structured as a plurality of process components interacting with each other through service interfaces;
each of the process components comprising a modular and application-independent package of reusable software implementing a respective and distinct business process, the business process comprising functionality exposed by the process component via at least one service interface, the plurality of process components including:

an Inbound Delivery Processing process component that combines tasks concerning inbound delivery processes and enables communication with a vendor and an invoicing process component;

a Material Inspection Processing process component that provides services related to quality inspection;

a Site Logistics Processing process component that supports preparation and execution tasks concerning internal inventory movement in a warehouse type environment;

a Confirmation and Inventory process component that combines tasks required to confirm inventory changes;

a Purchase Request Processing process component that provides a request or instruction to the purchasing department to purchase specified goods or services in specified quantities within a specified time;

a Purchase Order Processing process component that includes a purchase order business object and a purchase order confirmation business object;

a Purchasing Contract process component that handles an agreement between a purchaser and a supplier that details the supply of goods or the performance of services at agreed conditions;

a Supplier Invoice Processing process component that includes a supplier invoice business object and a supplier invoice request business object;

a Demand Forecast Processing process component that collects demand forecasts for further processing;

a Supply and Demand Matching process component that combines the tasks necessary to ensure that sufficient material receipt elements exist to cover material demand;

an External Procurement Trigger and Response process component that combines the tasks necessary for processing planned external procurement orders and provides an interface to purchasing from a supply planning perspective;

a Logistics Execution Control process component that controls and monitors the supply chain execution activities necessary for the fulfillment of an order; and a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:

the Logistics Execution Control process component and the Inbound Delivery Processing process component, where the pair-wise interaction between the Logistics Execution Control process component and the Inbound Delivery Processing process component includes the transmission of:
a delivery request fulfillment request message from the Logistics Execution Control process component to the Inbound Delivery Processing process component, the delivery request fulfillment request message instructions to support the control, triggering, and monitoring of supply chain execution activities associated with a requested fulfillment of an order; and a delivery request fulfillment confirmation message from the Inbound Delivery Processing process component to the Logistics Execution Control process component, the delivery request fulfillment confirmation message containing delivery request fulfillment information associated with a requested fulfillment of an order;

the Purchase Order Processing process component and the Supplier Invoice Processing process component, where the pair-wise interaction between the Purchase Order Processing process component and the Supplier Invoice Processing process component includes the transmission of:

an invoicing due notification message from the Purchase Order Processing process component to the Supplier Invoice Processing process component, the invoicing due notification message comprising a notification to the Supplier Invoice Processing process component to create or update a reference object to perform invoice verification with reference to a purchase order; and a supplier invoice request invoiced values notification message from the Supplier Invoice Processing process component to the Purchase Order Processing process component, the supplier invoice request invoiced values notification message confirming that a corresponding purchase order is not changed to an amount lower than an already-delivered purchase order delivered if parts of a purchase order have been previously posted;

the Purchase Order Processing process component and the Sales Order Processing at Supplier process component;

the Customer Invoice Processing process component and the Supplier Invoice Processing component;

the Inbound Delivery Processing process component and the Supplier Invoice Processing process component, where the pair-wise interaction between the Inbound Delivery Processing process component and the Supplier Invoice Processing process component includes the transmission of:

an invoicing due notification message from the Inbound Delivery Processing process component to the Supplier Invoice Processing process component, the invoicing due notification message notifying the Supplier Invoice Processing process component of the creation of a goods and service acknowledgement;

the Purchase Order Processing process component and the External Procurement Trigger and Response process component, where the pair-wise interaction between the Purchase Order Processing process component and the External Procurement Trigger and Response process component includes the transmission of:

a purchase order notification message from the Purchase Order Processing process component to the External Procurement Trigger and Response process component, the purchase order notification message providing the External Procurement Trigger and Response process component with notifications from a planning system about postings of goods receipts and the fulfillment of a purchase order; and a purchase order fulfillment notification message from the External Procurement Trigger and Response process component to the Purchase Order Processing process component, the purchase order fulfillment notification message providing the Purchase Order Processing process component with purchase order fulfillment data when new inventories are posted;

the Logistics Execution Control process component and the Site Logistics Processing process component, where the pair-wise interaction between the Logistics Execution Control process component and the Site Logistics Processing process component includes the transmission of:

a site logistics request message from the Logistics Execution Control process component to the Site Logistics Processing process component, the site logistics request message comprising a request to maintain a site logistics request; and a site logistics request confirmation message from the Site Logistics Processing process component to the Logistics Execution Control process component, the site logistics request confirmation message confirming receipt of a site logistics request message and acknowledging quantities and delivery dates associated with the site logistics request; and the External Procurement Trigger and Response process component and the Purchase Request Processing process component, where the pair-wise interaction between the External Procurement Trigger and Response process component and the Purchase Request Processing process component includes the transmission of:

a purchase request message from the External Procurement Trigger and Response process component to the Purchase Request Processing process component, the purchase request message representing a request from a supply planner to a buyer to procure products and/or services for the supply planner; and a purchase request confirmation message from the Purchase Request Processing process component to the External Procurement Trigger and Response process component, the purchase request confirmation message confirming receipt of the purchase request.

13. The system of claim 12, wherein:
each of the process components includes at least one business object; and
none of the business objects of any one of the process components interacts directly with any of the business objects included in any of the other process components.

14. The system of claim 12, wherein:
none of the business objects included in any one of the process components is included in any of the other process components.

15. The system of claim 12, wherein:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component.

16. The system of claim 12, the system comprising multiple hardware platforms, wherein:
the Inbound Delivery Processing process component, the Material Inspection Processing process component, the Site Logistics Processing process component, and the Confirmation and Inventory process component are deployed on a first hardware platform;
the Purchase Request Processing process component, the Purchase Order Processing process component Purchase Order Processing process component Purchase Order Processing process component, and the Purchasing Contract process component are deployed on a second hardware platform;
the Supplier Invoice Processing process component is deployed on a third hardware platform;
the Demand Forecast Processing process component, the Supply and Demand Matching process component, the External Procurement Trigger and Response process component, and the Logistics Execution Control process component are deployed on a fourth hardware platform; and
the Demand Planning process component are deployed on a fifth hardware platform.

17. The system of claim 16, wherein each of the first through the fifth hardware platforms are distinct and separate from each other.

18. A method for developing a computer software application, the method comprising the following steps performed by at least one processor:
obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable software implementing a respective and distinct business process, the design further specifying a set of process component interactions based on messages transmitted between two or more process components, wherein
the specified process components include:
an Inbound Delivery Processing process component that combines tasks concerning inbound delivery processes and enables communication with a vendor and an invoicing process component;
a Material Inspection Processing process component that provides services related to quality inspection;
a Site Logistics Processing process component that supports preparation and execution tasks concerning internal inventory movement in a warehouse type environment;
a Confirmation and Inventory process component that combines tasks required to confirm inventory changes;
a Purchase Request Processing process component that provides a request or instruction to the purchasing department to purchase specified goods or services in specified quantities within a specified time;
a Purchase Order Processing process component that includes a purchase order business object and a purchase order confirmation business object;
a Purchasing Contract process component that handles an agreement between a purchaser and a supplier that details the supply of goods or the performance of services at agreed conditions;
a Supplier Invoice Processing process component that includes a supplier invoice business object and a supplier invoice request business object;
a Demand Forecast Processing process component that collects demand forecasts for further processing;
a Supply and Demand Matching process component that combines the tasks necessary to ensure that sufficient material receipt elements exist to cover material demand;
an External Procurement Trigger and Response process component that combines the tasks necessary for processing planned external procurement orders and provides an interface to purchasing from a supply planning perspective;
a Logistics Execution Control process component that controls and monitors the supply chain execution activities necessary for the fulfillment of an order; and wherein
the process component interactions include interactions between:
the Logistics Execution Control process component and the Inbound Delivery Processing process component, where the interaction between the Logistics Execution Control process component and the Inbound Delivery Processing process component includes the transmission of:
a delivery request fulfillment request message from the Logistics Execution Control process component to the Inbound Delivery Processing process component, the delivery request fulfillment request message instructions to support the control, triggering, and monitoring of supply chain execution activities associated with a requested fulfillment of an order; and
a delivery request fulfillment confirmation message from the Inbound Delivery Processing process component to the Logistics Execution Control process component, the delivery request fulfillment confirmation message containing delivery request fulfillment information associated with a requested fulfillment of an order;
the Purchase Order Processing process component and the Supplier Invoice Processing process component, where the interaction between the Purchase Order Processing process component and the Supplier Invoice Processing process component includes the transmission of:
an invoicing due notification message from the Purchase Order Processing process component to the Supplier Invoice Processing process component, the invoicing due notification message comprising a notification to the Supplier Invoice Processing process component to create or update a reference object to perform invoice verification with reference to a purchase order; and
a supplier invoice request invoiced values notification message from the Supplier Invoice Processing process component to the Purchase Order Processing process component, the supplier invoice request invoiced values notification message confirming that a corresponding purchase order is not changed to an amount lower than an already-delivered purchase order delivered if parts of a purchase order have been previously posted;

the Purchase Order Processing process component and the Sales Order Processing at Supplier process component;

the Customer Invoice Processing process component and the Supplier Invoice Processing component;

the Inbound Delivery Processing process component and the Supplier Invoice Processing process component, where the interaction between the Inbound Delivery Processing process component and the Supplier Invoice Processing process component includes the transmission of:

an invoicing due notification message from the Inbound Delivery Processing process component to the Supplier Invoice Processing process component, the invoicing due notification message notifying the Supplier Invoice Processing process component of the creation of a goods and service acknowledgement;

the Purchase Order Processing process component and the External Procurement Trigger and Response process component, where the interaction between the Purchase Order Processing process component and the External Procurement Trigger and Response process component includes the transmission of:

a purchase order notification message from the Purchase Order Processing process component to the External Procurement Trigger and Response process component, the purchase order notification message providing the External Procurement Trigger and Response process component with notifications from a planning system about postings of goods receipts and the fulfillment of a purchase order; and a purchase order fulfillment notification message from the External Procurement Trigger and Response process component to the Purchase Order Processing process component, the purchase order fulfillment notification message providing the Purchase Order Processing process component with purchase order fulfillment data when new inventories are posted;

the Logistics Execution Control process component and the Site Logistics Processing process component, where the interaction between the Logistics Execution Control process component and the Site Logistics Processing process component includes the transmission of:

a site logistics request message from the Logistics Execution Control process component to the Site Logistics Processing process component, the site logistics request message comprising a request to maintain a site logistics request; and a site logistics request confirmation message from the Site Logistics Processing process component to the Logistics Execution Control process component, the site logistics request confirmation message confirming receipt of a site logistics request message and acknowledging quantities and delivery dates associated with the site logistics request;

the External Procurement Trigger and Response process component and the Purchase Request Processing process component, where the interaction between the External Procurement Trigger and Response process component and the Purchase Request Processing process component includes the transmission of:

a purchase request message from the External Procurement Trigger and Response process component to the Purchase Request Processing process component, the purchase request message representing a request from a supply planner to a buyer to procure products and/or services for the supply planner; and a purchase request confirmation message from the Purchase Request Processing process component to the External Procurement Trigger and Response process component, the purchase request confirmation message confirming receipt of the purchase request; and generating, using the at least one processor on the computer system, a computer software application to perform the set of processes based on the obtained design including the specified process components and the specified process component interactions.

19. The method of claim 18, wherein:

each process in the set of processes is a business process transforming a defined business input into a defined business outcome.

20. The method of claim 18, wherein:

obtaining digital data representing the architectural design further comprises editing the design before using the design.

* * * * *